(12) United States Patent
Kondo et al.

(10) Patent No.: US 10,487,239 B2
(45) Date of Patent: Nov. 26, 2019

(54) INSULATING COATING MATERIAL AND USE OF SAME

(71) Applicant: Kaneka Corporation, Osaka (JP)

(72) Inventors: Yasutaka Kondo, Shiga (JP); Makoto Tawada, Shiga (JP); Kazuhiro Ono, Shiga (JP)

(73) Assignee: Kaneka Corporation (JP)

( * ) Notice: Subject to any disclaimer, the term of this patent is extended or adjusted under 35 U.S.C. 154(b) by 183 days.

(21) Appl. No.: 14/954,305

(22) Filed: Nov. 30, 2015

(65) Prior Publication Data

US 2016/0075916 A1   Mar. 17, 2016

Related U.S. Application Data

(63) Continuation of application No. PCT/JP2014/063944, filed on May 27, 2014.

(30) Foreign Application Priority Data

May 31, 2013   (JP) .................................. 2013-115923

(51) Int. Cl.
*B32B 27/30* (2006.01)
*B32B 27/34* (2006.01)
(Continued)

(52) U.S. Cl.
CPC .............. *C09D 179/08* (2013.01); *B32B 7/02* (2013.01); *B32B 27/08* (2013.01); *B32B 27/281* (2013.01);
(Continued)

(58) Field of Classification Search
CPC ........ H01B 3/306; H01B 13/06; H01B 3/445; C08L 83/06; C08L 179/08; C09D 183/06; C09D 179/08; C09J 183/06; C09J 179/08; C08G 73/105; C08G 73/1042; C08G 73/1046; C08G 73/1067; C08G 73/1071;
(Continued)

(56) References Cited

U.S. PATENT DOCUMENTS 4,801,506 A   1/1989   Motonari et al.
5,006,411 A   4/1991   Motonari et al.
(Continued)

FOREIGN PATENT DOCUMENTS

CN   101939796 A   1/2011
CN   102575034 A   7/2012
(Continued)

OTHER PUBLICATIONS

UBE Europe GmbH, Upilex-S Technical Data Sheet (2005).*
(Continued)

*Primary Examiner* — Kregg T Brooks
(74) *Attorney, Agent, or Firm* — Lerner, David, Littenberg, Krumholz & Mentlik, LLP

(57) ABSTRACT

An insulating coating material is provided herein. In some embodiments, the insulating coating material comprises an insulating film comprising a polyimide resin, wherein the insulating film, when measuring a tensile elasticity in accordance with ASTM D882, having a stress at 5% strain of 180 MPa or greater and a stress at 15% strain of 225 MPa or greater, wherein the stress at 15% strain is greater than the stress at 5% strain.

13 Claims, 2 Drawing Sheets

(51) Int. Cl.

| | | |
|---|---|---|
| B32B 7/02 | (2019.01) | |
| B32B 27/08 | (2006.01) | |
| B32B 27/28 | (2006.01) | |
| B32B 27/32 | (2006.01) | |
| H01B 3/30 | (2006.01) | |
| H01B 7/02 | (2006.01) | |
| H01B 13/06 | (2006.01) | |
| H01B 13/08 | (2006.01) | |
| H01B 13/26 | (2006.01) | |
| H01B 17/56 | (2006.01) | |
| H01B 17/60 | (2006.01) | |
| H01B 3/44 | (2006.01) | |
| C09D 179/08 | (2006.01) | |
| C09J 127/20 | (2006.01) | |
| C08G 73/10 | (2006.01) | |
| C09J 7/25 | (2018.01) | |

(52) U.S. Cl.
CPC ............ *B32B 27/30* (2013.01); *B32B 27/304* (2013.01); *B32B 27/322* (2013.01); *C08G 73/105* (2013.01); *C08G 73/1042* (2013.01); *C08G 73/1046* (2013.01); *C08G 73/1067* (2013.01); *C08G 73/1071* (2013.01); *C09J 7/25* (2018.01); *H01B 3/306* (2013.01); *H01B 3/445* (2013.01); *H01B 13/06* (2013.01); *B32B 2307/206* (2013.01); *B32B 2307/51* (2013.01); *B32B 2307/54* (2013.01); *B32B 2307/554* (2013.01); *B32B 2307/584* (2013.01); *B32B 2605/18* (2013.01); *C09J 2427/00* (2013.01)

(58) Field of Classification Search
CPC .......... B32B 2307/51; B32B 2307/554; B32B 2307/584; B32B 27/281; B32B 27/322
See application file for complete search history.

(56) References Cited

U.S. PATENT DOCUMENTS

| | | | |
|---|---|---|---|
| 5,731,088 A | | 3/1998 | La Court |
| 5,859,171 A | * | 1/1999 | Sawasaki ............ C08G 73/1042 528/176 |
| 6,127,509 A | * | 10/2000 | Pratte .................... B32L 327/34 428/411.1 |
| 7,018,704 B2 | | 3/2006 | Kaneshiro et al. |
| 7,022,402 B2 | | 4/2006 | Lacourt |
| 2003/0062190 A1 | | 4/2003 | Kim et al. |
| 2004/0081808 A1 | | 4/2004 | Kaneshiro et al. |
| 2005/0013998 A1 | | 1/2005 | Lacourt |
| 2009/0297858 A1 | | 12/2009 | Glenn et al. |
| 2010/0209681 A1 | | 8/2010 | Lee et al. |
| 2010/0282488 A1 | | 11/2010 | Zheng et al. |
| 2012/0156482 A1 | | 6/2012 | Hisano et al. |
| 2012/0222884 A1 | | 9/2012 | Honda et al. |
| 2012/0227790 A1 | | 9/2012 | Auman et al. |
| 2012/0228616 A1 | | 9/2012 | Auman et al. |
| 2012/0231257 A1 | | 9/2012 | Dunbar et al. |
| 2012/0231263 A1 | | 9/2012 | Auman et al. |
| 2012/0231264 A1 | | 9/2012 | Auman et al. |
| 2012/0292086 A1 | | 11/2012 | Auman et al. |
| 2013/0233590 A1 | | 9/2013 | Shanai et al. |
| 2014/0102752 A1 | | 4/2014 | Ushiwata et al. |
| 2016/0075916 A1 | | 3/2016 | Kondo et al. |
| 2017/0260331 A1 | | 9/2017 | Kondo et al. |
| 2017/0271044 A1 | | 9/2017 | Kondo et al. |

FOREIGN PATENT DOCUMENTS

| | | | |
|---|---|---|---|
| CN | 102791769 A | | 11/2012 |
| CN | 103302936 A | | 9/2013 |
| EP | 0811483 A1 | | 12/1997 |
| EP | 1498909 A1 | | 1/2005 |
| EP | 2503558 A1 | | 9/2012 |
| JP | S62162542 A | | 7/1987 |
| JP | S62162543 A | | 7/1987 |
| JP | 02103804 A | * | 4/1990 |
| JP | 04303649 A | | 10/1992 |
| JP | 04303652 A | | 10/1992 |
| JP | 07037439 A | | 2/1995 |
| JP | H10100340 A | | 4/1998 |
| JP | 11058543 A | | 3/1999 |
| JP | 2001508588 A | | 6/2001 |
| JP | 2004216830 A | * | 8/2004 |
| JP | 2004533092 A | | 10/2004 |
| JP | 2005035300 A | | 2/2005 |
| JP | 2007030501 A | | 2/2007 |
| JP | 2007077231 A | | 3/2007 |
| JP | 2008016603 A | * | 1/2008 |
| JP | 2008028488 A | | 2/2008 |
| JP | 2012195290 A | | 10/2012 |
| JP | 2013030421 A | | 2/2013 |
| JP | 2013051030 A | | 3/2013 |
| JP | 2013512535 A | | 4/2013 |
| JP | 2013089585 A | | 5/2013 |
| JP | 2014082083 A | | 5/2014 |
| JP | 2014102946 A | | 6/2014 |
| JP | 2014111788 A | | 6/2014 |
| JP | 2014241201 A | | 12/2014 |
| WO | 9831022 A1 | | 7/1998 |
| WO | 2009032290 A1 | | 3/2009 |
| WO | 2014192733 A1 | | 12/2014 |

OTHER PUBLICATIONS

Hergenrother et al., "Polyimides from 2,3,3',4'-biphenyltetracarboxylic dianhydride and aromatic diamines," Polymer 43, 5077-5093 (2002).*
Partial machine translation of JP-02103804-A.*
British Standard Aerospace Series BS EN 3475-03:2002.*
Machine translation of JP-2008016603-A.*
Inoue et al., "Properties of Copolyimides Prepared from Different Tetracarboxylic Dianhydrides and Diamines," J. Appl. Polym. Sci. 62, 2303-2310 (Year: 1996).*
Machine translation of JP-2004216830-A.*
International Preliminary Report on Patentability for Application No. PCT/JP2014/063944 dated Dec. 1, 2015.
International Search Report for Application No. PCT/JP2015/082304 dated Feb. 23, 2016.
International Search Report for Application No. PCT/JP2015/082305 dated Feb. 16, 2016.
Partial Supplementary European Search Report for Application No. 14804934.9 dated Jan. 5, 2017.
Chinese Office Action for Application No. CN201480030510.1 dated Nov. 4, 2016.
International Search Repor for Application No. PCT/JP2014/063944 dated Aug. 19, 2014.
European Search Report for Application No. 15862218.3 dated Jul. 2, 2018.
Furrer, et al., "ASM Handbook: Fundamentals of Modeling for Metals Processing", vol. 22A, ASM International, Dec. 2009, 5 pages.
Office Action dated Feb. 21, 2019 in U.S. Appl. No. 15/606,433.
International Preliminary Report on Patentability and Written Opinion dated Jun. 8, 2017 in PCT/JP2015/082305.
International Preliminary Report on Patentability and Written Opinion dated Jun. 8, 2017 in PCT/JP2015/082304.
Office Action dated Aug. 7, 2018 in U.S. Appl. No. 15/606,433.
Office Action dated Nov. 16, 2018 in U.S. Appl. No. 15/606,508.
First Office Action for Chinese Application No. 201580064185.5 (published as CN107004473) dated Sep. 28, 2018.
Chinese Search Report for CN Application No. 201580064185.5, dated Sep. 19, 2018.

* cited by examiner

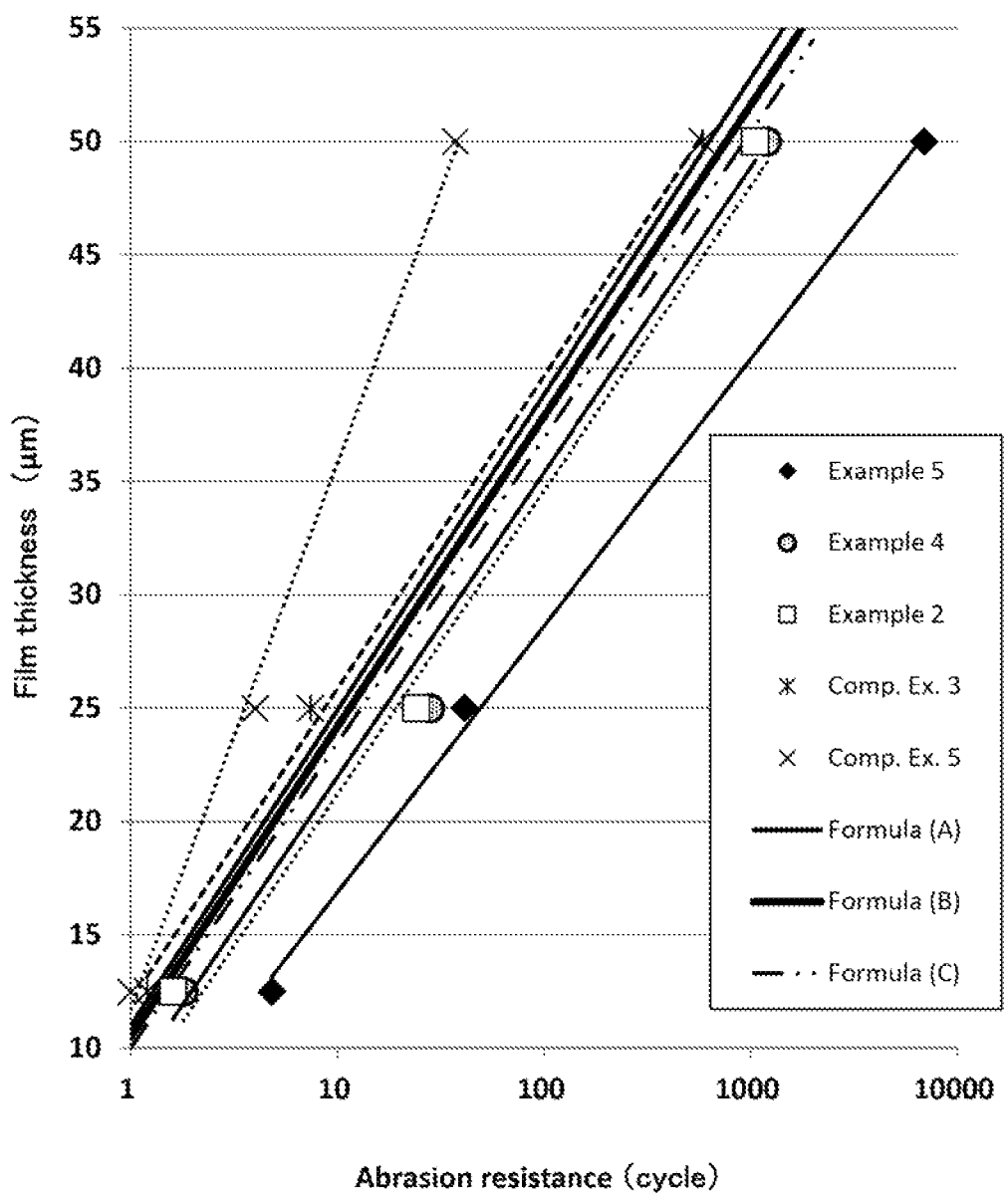

INSULATING COATING MATERIAL AND USE OF SAME

CROSS-REFERENCE TO RELATED APPLICATIONS

The present application is a bypass continuation of international application no. PCT/JP2014/063944, filed May 27, 2014, and designating the United States, and which claims priority from Japanese Patent Application No. 2013-115923, filed May 31, 2013, all of which are incorporated herein by reference.

FIELD OF INVENTION

The present invention relates to an insulating coating material and use thereof. In some embodiments, an insulating coating material can be part of a wire or cable in aerospace applications.

BACKGROUND OF THE INVENTION

An insulating material for a wire or cable in aerospace applications requires endurance properties, such as abrasion resistance, cut-through resistance, and the like, as well as other properties, such as heat resistance, electric insulating, chemical resistance and flame resistance.

There has been developed multilayer polyimide-fluoropolymer insulation having excellent cut-through resistance, such as discussed in Japanese Patent Publication No. 1998-100340, U.S. Patent Application Publication No. 2010/0282488, and U.S. Pat. No. 7,022,402.

SUMMARY OF THE INVENTION

Problem(s) that the Present Invention Pertains to Solve

Among the above-mentioned properties, however, abrasion resistance may be more significant than cut-through resistance. For example, from a safety perspective for a wire or cable in aerospace, a shear force may be applied parallel to a surface of the wire or cable by an object, such as an aircraft wall, rather than applied perpendicular to the surface of the wire or cable. Thus, improved abrasion resistance is a more preferred property for insulating coating material in such applications. There remains a need for insulating coating material having excellent abrasion resistance.

Solution to the Problem

In order to solve the above-mentioned problem, the present inventors did intensive studies, and found that an insulating coating material with excellent abrasion resistance can be obtained by using an insulating film having a certain stress-strain behavior. The present invention has been completed based on these findings. Embodiments of the present invention can include the following:

(1) An insulating coating material comprising: an insulating film comprising polyimide resin, wherein the insulating film has, when measuring a tensile elasticity in accordance with ASTM D882, a stress at 5% strain of 180 MPa or greater and a stress at 15% strain of 225 MPa or greater, wherein the stress at 15% strain is greater than the stress at 5% strain. In some embodiments, the insulating coating material further comprises an adhesive layer comprising fluororesin.

(2) An insulating coating material comprising: an insulating film comprising polyimide resin, wherein a thickness of the insulating film ($\mu$m) and abrasion resistance (cycle) satisfy a relationship of the formula (A):

(A) Thickness of insulating film<6.05*ln(abrasion resistance)+11.0, wherein the abrasion resistance is an average of 5 measurements performed on an assessment wire in accordance with the British Standard Aerospace Series BS EN 3475-503, wherein the assessment wire is a laminated body, the laminated body comprising, in order, layers of the insulating film, tetrafluoroethylene hexafluoropropylene copolymer (FEP) film (12 $\mu$m), 1 mm$\phi$ conductive wire, an FEP film (12 $\mu$m) and the insulating film, wherein the laminated body is pressurized at 78 kgf/cm$^2$ at 280° C. for 10 minutes to obtain the assessment wire. In some embodiments, the insulating coating material further comprises an adhesive layer comprising fluororesin.

(3) An insulating coating material comprising: an insulating film comprising polyimide resin, wherein the insulating film is a polyimide film obtained by reacting a diamine component and a dianhydride component to form a polyamide acid, and imidizing the polyamide acid to form the polyimide film, wherein the diamine component comprises 65-100 mol % of p-phenylenediamine (PDA) and the dianhydride component comprises 20-100 mol % of 3,3',4,4'-biphenyl-tetracarboxylic dianhydride (BPDA). In some embodiments, the insulating coating material further comprises an adhesive layer comprising fluororesin.

(4) A method for producing an insulating coating material comprising: an insulating film, wherein the insulating film is a polyimide film, the method for producing the insulating film comprising:

forming the polyimide film by reacting a diamine component and a dianhydride component to form a polyamide acid, and imidizing the polyamide acid to form the polyimide film, wherein the polyamide acid is obtained by a production method comprising:

(A) a step of reacting a dianhydride component and a diamine component in an organic polar solvent, wherein one component has an excess molar amount than the other, to obtain a prepolymer having an amino group or a dianhydride group at both terminal ends; and (B) a step of synthesizing the polyamide acid by reacting the prepolymer obtained in the step (A) with a dianhydride component and a diamine component, wherein a total molar amount of dianhydride components in steps (A) and (B) is equimolar with a total molar amount of diamine components in steps (A) and (B);

wherein an ether amount ranges from 35.0 mol % to 70.0 mol % based on a total molar amount of dianhydride components and diamine components used in the step (A) of 100 mol %, and wherein the ether amount is a sum of mol % of oxygen atoms derived from an ether bond contained in dianhydride components and diamine components used at the step (A). In some embodiments, the insulating coating material further comprises an adhesive layer, and the method further comprises forming the adhesive layer on the insulating film. In some embodiments, the adhesive layer comprises fluororesin.

(5) An insulating cable having an insulating coating material of one of the above (1) to (3).

(6) A method for producing an insulating cable including, comprising: forming an insulating coating material in accordance with the method for producing an insulating coating material described in (4); and wrapping an insulating coating material around an electric conductor.

Effect(s) of the Invention

According to an insulating coating material related to the present invention, it achieves an effect of excellent abrasion resistance. Therefore, it is useful to be used in a wire, cable, etc. in aerospace.

DESCRIPTION OF THE DRAWINGS

FIG. 2 depicts to the embodiment of the present invention depicted in FIG. 1, in comparison to Formulas (A) to (C) described herein.

DETAILED DESCRIPTION

Figure 1:
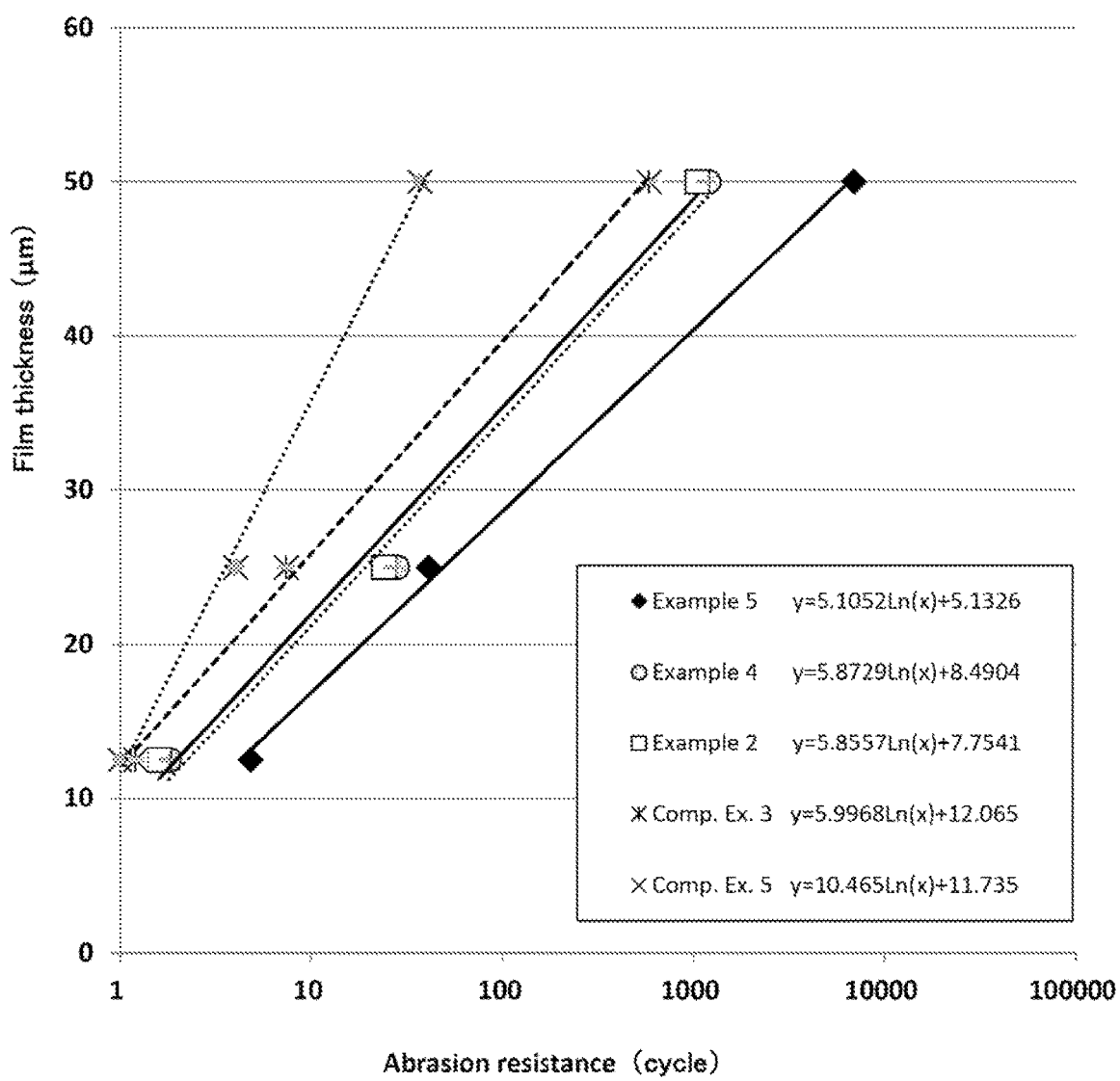
FIG. 1 depicts a relationship between a thickness of an insulating film (μm) and abrasion resistance (cycle) in accordance with some embodiments of the present invention.

Embodiments of the present invention are discussed herein. All of academic documents and patent publications cited in the present specification are hereby incorporated herein by reference. Unless specifically provided in the present specification, a range of "A-B" means "A or greater (including A and greater than A) to B or lower (including B and lower than B)"; "%" means "mass %"; and "part" means "mass part" respectively. As used herein, a 'random' polymer is understood by one of ordinary skill in the art, and can be a randomly arranged sequence of monomer units in a polymer chain. As used herein, a 'sequenced' polymer is a polymer made using a fourth embodiment of the present invention as described herein. In some embodiments, a 'sequenced' polymer may include a first segment and a second segment. For example, a first segment can be made using step (A) of the fourth embodiment as described herein, and a second segment can be made using step (B) of the fourth embodiment as described herein. The first and second segments can be a flexible or rigid segment. In some embodiments, a sequenced polymer includes a flexible segment and a rigid segment. In some embodiments, a sequenced polymer includes a flexible segment made using step (A) of the fourth embodiment described herein, and a rigid segment using step (B) of the fourth embodiment described herein. The polymers of a first embodiment, second embodiment, and third embodiment as described herein can be a random polymer or a sequenced polymer.

First Embodiment

1. Insulating Coating Material

An insulating coating material related to the present invention may comprise an insulating film, and the said insulating film has, when a tensile elasticity is measured in accordance with ASTM D882, a stress at 5% strain of 180 MPa or greater and a stress at 15% strain of 225 MPa or greater, wherein the stress at 15% strain of which is greater than the stress at 5% strain. Other specific structures, materials etc. are not particularly limited. The insulating coating material may further comprise an adhesive layer.

The present inventors did intensive studies on endurance of an insulating coating material, and found the new perception that where an insulating film of an insulating coating material satisfies two conditions concurrently: (i) high yield strength; and (ii) high resistance against plastic deformation, an insulating coating material made therefrom exhibits excellent abrasion resistance.

"Yield strength" is a term known to a person of ordinary skill in the art. For example, "yield strength" can be understood as approximately a point on a stress-strain curve where a material behavior changes from elastic behavior to plastic behavior. In the present application, "yield strength" may be approximated by "a stress at 5% strain" when a tensile elasticity is measured in accordance with ASTM D882 because the inventors have discovered for most insulating films measured, a change in a behavior of the material occurs at approximately a stress at 5% strain. It is conceivable that other approximations of yield strength could be used depending on the behavior of the insulating films being measured. For example, "having high yield strength" in the present specification can mean as "a stress at 5% strain being 180 MPa or greater."

A property of "high resistance against plastic deformation" is intended to mean as a stress increasing at the time of the plastic deformation, or as a stress necessary for the plastic deformation being large. For example, the property "high resistance against plastic deformation" can be measured in the plastic deformation region of the stress-strain curve, and it is generally desired that an amount of stress necessary to further strain a material in a plastic deformation region is large. For example, one way to describe the property of "high resistance against plastic deformation", for example, "a slope (i.e. a slope of a stress-strain (s-s) curve)" when representing results of measuring a tensile elasticity as a graph with "a stress (MPa)" for a vertical axis and "a strain (mm)" for a horizontal axis. For instance, one example of this slope is the slope of the stress-strain between the yield strength and another point, such as stress at 15% strain. Specifically, it may be illustrated in a stress-strain curve: a slope between "a stress at 5% strain" and "a stress at 15% strain;" a slope between "a stress at 10% strain" and "a stress at 20% strain;" a slope between "a stress at 15% strain" and "a stress at 20% strain" etc. However, since "a stress at x %strain" varies depending on an insulating film that forms a straight line to read a slope, the "slope" may not define uniformly the property of "high resistance against plastic deformation." Therefore, the property of "high resistance against plastic deformation" is to be assessed by "a stress at 15% strain" when a tensile elasticity is measured in accordance with ASTM D882 in the present specification. Specifically in the present specification, it is preferred that, in order to achieve the desired result for the purpose of the present invention, the property of "high resistance against plastic deformation" is found when "a stress at 15% strain is 225 MPa or greater," taking into account that it is necessary to secure the property of "having high yield strength" as well.

The property of "high resistance against plastic deformation" may be further assessed by using "a stress at 10% strain" and/or "a stress at 20% strain" as well, when measuring a tensile elasticity in accordance with ASTM D882. For example, on the insulating film of an insulating coating material of the present invention, it is further preferred that the insulating film has a stress at 10% strain of 210 MPa or greater, and/or a stress at 20% strain of 235 MPa or greater. It may be illustrated by using a stress at 25% strain, by which it is preferred that the stress at 25% strain is 250 MPa or greater.

In addition, as a consequence of the studies by the present inventors, they found that:
(a) It is insufficient if an insulating film has merely a high degree of elasticity;
(b) It is insufficient if an insulating film has merely a high destruction strength (which may be rephrased as a strength of "a stress at a certain strain" when the insulating film is stretched to the extent it fractures, i.e. maximum test stress);

(c) It is insufficient if an insulating film has merely a high yield strength; and (d) It is insufficient if an insulating film has merely "high resistance to plastic deformation."

Rather, the present inventors found that it is effective for an insulating film to have both properties of high yield strength and high resistance against plastic deformation. That is, the present invention requires an insulating film satisfy both properties concurrently: having high yield strength; and high resistance against plastic deformation. Such a perception was not conventionally known and is their own new breakthrough perception that the present inventors has found.

"A stress at x % strain" means as a stress at the time when a strain reaches at a predetermined figure (x %) in the present specification. For example, it is used where a stress-strain curve does not show a yield point. For your reference "a stress at x % strain" is a generally defined benchmark, not a so-called special parameter. For example, the JIS standard (JIS K7161) stipulates that the predetermined figure complies with the standard for a test subject material or an agreement between the parties. In the present specification, however, the definition of "a stress at x % strain" prioritizes the later-mentioned ASTM D882, while the JIS standard remains merely as reference.

A measurement method for "a stress at x % strain" may be obtained from measurement data on a tensile elasticity. The measurement of a tensile elasticity is performed in accordance with the ASTM D882.

In terms of the insulating film, it is more preferred that: "a stress at 5% strain" is 200 MPa or greater; it is preferred "a stress at 10% strain" is 220 MPa or greater; "a stress at 15% strain" is 235 MPa or greater; "a stress at 20% strain" is 245 MPa or greater; and "a stress at 25% strain" is 260 MPa or greater.

In addition in terms of the insulating film, it is further preferred that: "a stress at 5% strain" is 210 MPa or greater; "a stress at 10% strain" is 230 MPa or greater; "a stress at 15% strain" is 245 MPa or greater; "a stress at 20% strain" is 255 MPa or greater; and "a stress at 25% strain" is 265 MPa or greater.

Depending on an insulating film, there may be the one with low elasticity, which would result in, for example, "a stress at 20% strain" or "a stress at 25% strain" cannot be measured. It is noted for the record that, for the purpose of the present invention, as long as at least "a stress at 5% strain" and "a stress at 15% strain" can be measured in such a case, it is not necessary to use "a stress at 20% strain" or "a stress at 25% strain" as a reference.

In addition, in light of a technical idea underlying the present invention, since the higher "a stress at x % strain" is, the more preferred. However, it is not necessary to set an upper limit in particular. If it were to be set, it is preferred that the upper limit of "a stress at 5% strain" ranges from 300 to 500 MPa; it is preferred the upper limit of "a stress at 10% strain" ranges from 330 to 540 MPa; it is preferred that the upper limit of "a stress at 15% strain" ranges from 350 to 560 MPa; and it is preferred that the upper limit of "a stress at 20% strain" ranges from 370 to 580 MPa.

A thickness of an insulating film is, although not limited to in particular, for example, preferably 25 µm or lower, more preferred to be 20 µm or lower, most preferred to be 17 µm or lower. The lower limit may be, although not limited to in particular, for example, 5 µm or greater.

With respect to a relationship between a thickness of an insulating film and abrasion resistance, the more a thickness of an insulating film increases, the higher abrasion resistance tends to get. On another front, weight-saving is strongly demanded for an insulating cable used for an aircraft for example. It is a problem because although a simple increase of a thickness of an insulating film enhances abrasion resistance, it will also cause an increase in weight. Therefore, it is desirable to enhance abrasion resistance without increasing a thickness of an insulating film to the extent possible. An insulating coating material related to the present invention exhibits excellent abrasion resistance as compared to conventional materials, not to mention in the case where a film thickness is large but also in the case where a film is thin.

In addition, an insulating coating material related to the present invention has not only an insulating film but an adhesive layer on one surface or both surfaces of the insulating film. On a face of an adhesive layer, a removable film may be affixed in order to protect the adhesive layer until its use by peeling the removable film.

A form of an insulating coating material is preferably, although not limited to in particular, the one for example that is easily adhered to an electric conductor of an electric wire, cable (wire) etc. In the case where a conductor to be insulated and coated is a long object such as an electrical wire etc., it is preferred that an insulating coating material is elongated so that it can wrap and adhere. In the case where a conductor to be insulated and coated is in a plate-shape having a relatively large area, it is preferred that an insulating coating material is in a similar shape slightly larger than the conductor.

For a method to adhere an insulating coating material to a conductor, any publicly known method or the combination thereof may be used.

In the following section, an insulating film and an adhesive film will be further described in details.

Insulating Film

An insulating film that can be used for an insulating coating material related to the present invention may be a film comprising various insulating materials, and there is no limit in particular. Examples include polyurethane resin, poly (meta) acrylic resin, polyvinyl resin, poly-styrene resin, polyethylene resin, polypropylene resin, polyimide resin, polyamide resin, polyacetal resin, polycarbonate resin, polyester resin, polyphenylene ether resin, polyphenylene sulfide resin, polyether sulfone resin, polyether ether ketone resin, etc., which may be used individually or in combination of two or more kinds. Among those, a polyimide film using polyimide resin is preferred, taking into account in particular various properties such as heat resistance, electric insulating, chemical resistance, flame resistance, etc.

A polyimide film is prepared by using polyamide acid as a precursor (hereinafter, the term "polyamide acid" is sometimes used as a polyamide precursor). A method for producing polyamide acid may be any publicly known method, although not limited to in particular. Generally for example, a polyamide acid organic solvent solution is obtained by dissolving an equimolar amount of a dianhydride component and a diamine component in an organic solvent solution. Then, a polyamide acid is produced by mixing the polyamide acid organic solvent solution so obtained under a controlled temperature condition until polymerization of the dianhydride component and the diamine component is completed. Such a polyamide acid solution is obtained at a concentration of generally 5-35 wt %, preferably 10-30 wt %. In the case where a concentration is within this range, appropriate molecular (molar) weight and solution viscosity may be obtained.

"Equimolar" in the present specification is not limited to the case where a dianhydride component and a diamine component are completely equimolar, but can also include the case where they are substantially equimolar.

A method for polymerizing the dianhydride component and the diamine component may be any publicly known method or combination thereof, although not limited to in particular. As one of the characteristic features of the polymerizing method on polymerization of a polyamide acid is an addition sequence of monomers. By arranging the addition sequence of monomers, it may control various properties of polyimide.

For the purpose of the present invention, any addition sequence of monomer may be used for polymerizing a polyamide acid. Although not limited to in particular, following polymerizing methods may be described as representative:

(1) A method for polymerizing, comprising: dissolving aromatic diamine in an organic polar solvent; and reacting with an equimolar amount of aromatic tetracarboxylic dianhydride to polymerize;

(2) A method for polymerizing, comprising: reacting aromatic tetracarboxylic dianhydride with a lower molar amount of aromatic diamine compound in an organic polar solvent to obtain a prepolymer having an acid anhydride group at both terminal ends; and using aromatic diamine compound to make an equimolar amount of aromatic tetracarboxylic dianhydride and aromatic diamine compound to polymerize.

(3) A method for polymerizing, comprising: reacting aromatic tetracarboxylic dianhydride with an excess molar amount of aromatic diamine compound in an organic polar solvent to obtain a prepolymer having an amino group at both terminal ends; adding further of aromatic diamine compound; and using aromatic tetracarboxylic dianhydride to comprise an equimolar amount of aromatic tetracarboxylic dianhydride and aromatic diamine compound to polymerize;

(4) A method for polymerizing, comprising: dissolving and/or dispersing an aromatic tetracarboxylic dianhydride in an organic polar solvent; and using an equimolar amount of an aromatic diamine compound to polymerize; and (5) A method for polymerizing, comprising: reacting an equimolar amount of aromatic tetracarboxylic dianhydride and aromatic diamine as a mixture in an organic polar solvent to polymerize.

These methods may be used individually or in combination thereof.

For the purpose of the present invention, a preferable polymerizing method to obtain polyimide resin may be a method of, after forming a block component of a polyimide precursor, forming a final polyimide precursor by using remained diamine and/or dianhydride. It is preferred to use in partial combination of methods described in the above (1) to (5).

As a diamine component that may be used as a base component, followings may be used individually or in combination thereof: 4,4'-diaminodephenylpropene; 4,4'-diaminodephenylmethane; 4,4'-diaminodephenyl sulfide; 3,3'-diaminodephenyl sulfone; 4,4'-diaminodephenyl sulfone; 4,4'-oxydianiline; 3,3'-oxydianiline; 3,4'-oxydianiline; 4,4'-diaminodephenyldiethylsilane; 4,4'-diaminodiphenylsilane; 4,4'-diaminodephenylethylphosphine oxide; 4,4'-diaminodiphenyl-N-methylamine; 4,4'-diaminodiphenyl-N-phenylamine; 1,4-diaminobenzene (p-phenylenediamine); bis {4-(4-aminophenoxy)phenyl}sulfone; bis {4-(3-aminophenoxy) biphenyl; 4,4'-bis(3-aminophenoxy) biphenyl; 1,3-bis (3-aminophenoxy) benzene; 1,4-bis(4-aminophenoxy) benzene; 1,3-bis(3-aminophenoxy) benzene; 3,3'-diaminobenzophenone; 4,4'-diaminobenzophenone; 2,2'-dimethyl-4,4' diaminobiphenyl; 2,2-bis(4-aminophenoxyphenyl) propane; 3,3'-dihydroxy-4,4'-diamino-1,1'-biphenyl; etc. In addition to the above diamine, any diamine may be used as an accessory component. As further preferred examples may include: 4,4'-oxydianiline; 1,3-bis(4-aminophenoxy) benzene; 3,4'-oxydianiline; 1,4-diaminobenzene (p-phenylenediamine); 2,2-bis {4-(4-aminophenoxy)phenyl}propane.

In addition, examples as a dianhydride component that may be optimally used include: pyromellitic dianhydride; 2,3,6,7-naphtalenetetracarboxylic dianhydride; 3,3',4,4'-benzophenonetetracarboxylic dianhydride; 2,2',3,3'-biphenyltetracarboxylic dianhydride; 3,3',4,4'-biphenyltetracarboxylic dianhydride; 2,2-bis(3,4-dicarboxyphenyl) propane dianhydride; p-phenylenbis (trimellitic acid monoester acid anhydride); 4,4'-oxydiphthalic dianhydride, etc., which may be used individually or in combination thereof. For the purpose of the present invention, it is preferred to use one or more dianhydride from pyromellitic dianhydride, 3,3',4,4'-benzophenonetetracarboxylic dianhydride, or 3,3',4,4'-biphenyltetracarboxylic dianhydride.

As a preferable solvent for synthesizing a polyamide acid, any solvent may be used as long as it is capable of dissolving such a polyamide acid, and no particular limitation is required. Examples may include an amide series solvent, i.e. N,N-dimethylformamide, N,N-dimethylacetamide, N-methyl-2-pirrolidone, etc. Among those, it may be further preferred to use N,N-demethylacetamide.

In addition, a polyimide film may further comprise a filler to enhance various characteristic features of a film such as smoothness, thermal conductivity, conductive property, corona resistance, loop stiffness, etc. Although anything may be used as filler, preferred examples include silica, titanium oxide, alumina, silicon nitride, boron nitride, calcium hydrogen phosphate, calcium phosphate, mica, etc.

In terms of a method for producing a polyimide film from polyamide acid solution, various methods may be used and no particular limitation is required. Examples may include thermal imidization and chemical imidization.

In addition for the purpose of the present invention, a particularly preferred method to produce a polyimide film preferably includes:

(i) the step of reacting aromatic diamine and aromatic tetracarboxylic dianhydride in an organic solvent to obtain an polyamide acid solvent;

(ii) the step of casting a film-forming dope comprising the polyamide acid solvent to a supporting body;

(iii) the step of stripping a gel film from the supporting body after heating it on the supporting body; and (iv) the step of imidizing remained amide acids and drying them by further heating.

It may use a dehydration agent represented by acid anhydride such as anhydrous acetic acid in the above steps, and a cure agent comprising imidization catalyst represented by tertiary amine etc. such as isoquinoline, quinolone, β-picoline, pyridine, diethylpyridine, etc.

A method is not particularly limited to obtain an insulating film that satisfies both properties concurrently, i.e., "having high yield strength" and "high resistance against plastic deformation." One of ordinary skill in the art may perform by reasonable trial and error based on the contents disclosed herein and the technical standard at the time of filing. For reference, a preferable method to obtain an insulating film that satisfies the above two properties is as follows:

a) As a diamine component, an oxydianiline (ODA) is used. Preferably, 15 mol % or greater of ODA is used based on the total diamine components;

b) The first step comprises reacting a dianhydride component and a diamine component in an organic polar solvent, wherein one component has an excess molar amount than the other, to obtain a prepolymer having an amino group or a dianhydride group at both terminal ends. The second step comprises reacting the prepolymer obtained by the first step with equimolar amounts of a dianhydride component and a diamine component to synthesize a solution comprising polyamide acid, to form a polyimide precursor. A prepolymer synthesized by the first step may have a flexible chemical structure or a rigid chemical structure. "A flexible chemical structure" is intended to mean as exhibiting flexibility at high temperature, the opposite of which is "a rigid chemical structure." In determining whether it is "a flexible chemical structure" or not may be utilized a method described later in the step (A) of a Fourth Embodiment (discussed below).

c) Preferable examples in terms of dianhydride used for producing a prepolymer having a rigid chemical structure include pyromellitic dianhydride (PMDA) and 3,3',4,4'-biphenyltetracarboxylic dianhydride (BPDA), while those in terms of diamine include p-phenylenediamine (PDA). It is preferred that the total amount of PMDA and PDA comprises 40 mol %-90 mol % of dianhydride in the entire polyimide. It is preferred that a prepolymer having a rigid chemical structure is formed as a second step.

d) It is preferred that a prepolymer having a flexible chemical structure contains ether bonds. For example, the dianhydride components and diamine components used comprise 35-70 mol % or lower of dianhydride components and/or diamine components containing ether bonds based on a total molar amount of 100 mol %. In addition, when synthesizing a prepolymer having a flexible chemical structure, it is preferred to include 3,3',4,4'-benzophenonetetracarboxylic dianhydride (BTDA). For example, the total dianhydride components that form a polyimide precursor preferably comprise 10-55 mol % of BTDA. One example of specific embodiments performing the above b) to d) may be described in the later fourth embodiment.

e) As a dianhydride component, BPDA is used. The total dianhydride components preferably comprises 30 mol % or greater of BPDA, more preferably 50 mol % or greater of BPDA, yet more preferably 70 mol % or greater of BPDA, and most preferably 90 mol % or greater of BPDA. BPDA may be used as 100 mol %.

The above methods are merely examples, which may be applied individually or in combination thereof. A method to obtain an insulating film that satisfies the above two properties is not limited to the above methods.

It is also preferred that the insulating film is a polyimide film obtained by reacting a diamine component and a dianhydride component to form a polyamide acid, and imidizing the polyamide acid to form the polyimide film, wherein the dianhydride component comprises at least one selected from a group consisting of 3,3',4,4'-benzophenonetetracarboxylic dianhydride (BTDA) and 3,3',4,4'-biphenyltetracarboxylic dianhydride (BPDA).

3. Adhesive Layer

As an adhesive layer that may be used for an insulating coating material related to the present invention, various adhesive layers may be used and there is no particular limitation. For example, any material may form it as long as the insulating film is easily adhered to an electric conductor of an electric wire, cable (wire) etc., although it is preferred to use a thermoplastic resin. More preferable among these is fluororesin from a perspective of insulation, chemical resistance, etc.

As fluororesin, followings may be used individually or in combination of the two or more: tetrafluoroethylene polymer; tetrafluoroethylene-hexafluoropropylene copolymer; tetrafluoroethylene-perfluoro (alkyl vinyl ether) copolymer; tetrafluoroethylene-ethylene copolymer; polychlorotrifluoroethylene; ethylene-chlorotrifluoroethylene copolymer; polyvinylidene fluoride; vinylidene fluoride-hexafluoropropylene copolymer; polyvinylfluoride; etc. Preferable among these are to use tetrafluoroethylene polymer or tetrafluoroethylene-perfluoro (alkyl vinyl ether) copolymer.

In terms of a thickness of an adhesive layer, although not limited, for example it is preferably 0.5-25 µm, more preferably 0.5-20 µm, yet more preferably 1.0-15 µm, and most preferably 1.0-12.5 µm.

An adhesive layer may have a structure of at least one layer on the insulating film, that is, an insulating coating material may have a two-layer structure. An adhesive layer may also have a structure formed on both surfaces of the insulating film, that is, an insulated coating film may have a three-layer structure. In addition, it may have a multiple-layer structure on one surface of the insulating film. Further, it may have a one-layer structure on one surface of the insulating film, and a multiple-layer structure on the other. That is, an insulating coating material related to the present invention may be produced by coating with an adhesive layer comprising fluororesin on one or both surface(s) of an insulating film such as polyimide film that functions as a base layer.

4. Use of Insulating Coating Material

The present invention may include an insulating cable having the insulating coating material. Such an insulating cable may be preferably used for example as a wire or cable in aerospace.

In terms of a method for producing the insulating cable, various methods are available and are not particularly limited. As one example, the insulating coating material may be produced by making a tape with a slit in narrow width, thereby wrapping in spirals (in whorl) such a tape of insulating coating material around an electric conductor (e.g. metal etc.). It may be possible to overlap another tape of insulating coating material after once wrapping a tape of insulating coating material around an electric conductor.

A tension added to a tape may vary widely when wrapping the insulating coating material around an electric conductor. It may range from a tension sufficient to avoid wrinkling to a tension powerful enough to cause a neck-down due to a stretch of the tape. Even if a tension is weak, heat-sealing (e.g. 240-500° C.) after wrapping would result in being wrapped fitly as a consequence, because the tape shrinks to some degree. The heat-sealing step may be set as one thinks fit depending on a thickness of an insulating film, a thickness of an adhesive layer, a material of an electric conductor, a speed of a factory line, a length of an open seal, etc.

It may be possible to wrap the insulating coating material around an electric conductor by using a standard electric coating machine (wrapping machine).

Second Embodiment

Other embodiment of an insulating coating material related to the present invention is described as follows. The second embodiment is described merely by a part different from the first embodiment. In terms of those not particularly described in this embodiment, the description in the first embodiment is incorporated herein as a matter common to the first embodiment.

An insulating coating material related to the present embodiment is the one comprising an insulating film and an adhesive layer, wherein a thickness of the insulating film (μm) and abrasion resistance (cycle) satisfy a relationship of the formula (A)

Thickness of insulating film<6.05*ln(abrasion resistance)+11.0, (A)

wherein the abrasion resistance is an average of 5 measurements performed on an assessment wire in accordance with the British Standard Aerospace Series BS EN 3475-503, wherein the assessment wire is a laminated body, wherein the laminated body comprising, in order, layers of an insulating film, tetrafluoroethylene hexafluoropropylene copolymer (FEP) film (12 μm), 1 mmφ conductive wire, an FEP film (12 μm) and an insulating film, wherein the laminated body is pressurized between adjacent SUS (Steel Use Stainless, or Stainless Steel) plates, each SUS plate having a buffer material (such as Kinyo Board, made by Kinyo Corporation) between the SUS plate and the laminated body, at 78 kgf/cm$^2$ at 280° C. for 10 minutes, to obtain the assessment wire. The "ln" in formula (A) represents a natural logarithm.

Although the conductor wire in the laminated body may be an electric wire, a cable, and the like, a particularly preferable conductor wire is that used in a wire or cable for aerospace applications.

In addition to the formula (A), the insulating film is more preferred to satisfy a relationship represented by the formula (B):

Thickness of insulating film<5.95*ln(abrasion resistance)+10.5, (B)

wherein the abrasion resistance is the same as the above.

In addition to the formulas (A) and (B), the insulating film is further preferred to satisfy a relationship represented by the formula (C):

Thickness of insulating film<5.85*ln(abrasion resistance)+10.0, (C)

wherein the abrasion resistance is the same as the above.

Those formulas (A) to (C) are the ones the present inventors found as a consequence of their intensive studies based on the knowledge. According to those formulas (A) to (C), it becomes possible to achieve a weight-saving of an insulating coating material, because the same abrasion resistance shared among them enables to make an insulating film thinner.

As depicted in FIG. 2 (single logarithmic chart), the formula (A) is adjacent to a graph obtained from the results of Comparative Example 3 as later described, and mathematizes a relationship between a thickness of an insulating film (μm) and abrasion resistance (cycle), wherein the insulating film is capable of obtaining an insulating coating material which properties exceed those of Comparative Example 3, by defining the slope and intercept from FIG. 2 (taking into account error of measurement results). The formula (C) is adjacent to a graph obtained from the results of Example 2 as later described, and mathematizes a relationship between a thickness of an insulating film (μm) and abrasion resistance (cycle), wherein the insulating film is capable of obtaining an insulating coating material having particularly preferred properties, by defining the slope and intercept from FIG. 2. The formula (B) stands in between the formula (A) and the formula (C), and mathematizes a relationship between a thickness of an insulating film (μm) and abrasion resistance (cycle), wherein the insulating film is capable of obtaining an insulating coating material having more preferred properties, by defining the slope and intercept from FIG. 2.

Therefore, with respect to an insulating coating material related to the present invention, a relationship between a thickness of an insulating film (μm) and abrasion resistance (cycle) is more preferred to satisfy the formula (B), and is particularly preferred to satisfy the formula (C).

It is also preferred that the insulating film is a polyimide film obtained by reacting a diamine component and a dianhydride component to form a polyamide acid, and imidizing the polyamide acid to form the polyimide film, wherein the dianhydride component comprises at least one selected from a group consisting of 3,3',4,4'-benzophenonetetracarboxylic dianhydride (BTDA) and 3,3',4,4'-biphenyltetracarboxylic dianhydride (BPDA).

An insulating coating material related to the present embodiment exhibits excellent abrasion resistance to conventional insulating coating materials, not to mention in the case where a film thickness is large but also in the case where a film thickness is thin.

Third Embodiment

Other embodiment of an insulating coating material related to the present invention is described as follows. The third embodiment is described merely by a part different from the first embodiment, like the second embodiment. In terms of those not particularly described in this embodiment, the description in the first embodiment is incorporated herein as a matter common to the first embodiment.

An insulating coating material related to the present embodiment has an insulating film and an adhesive layer, wherein the insulating film is a polyimide film obtained by reacting a diamine component and a dianhydride component to form a polyamide acid, and imidizing the polyamide acid to form the polyimide film, wherein the diamine component comprises 65-100 mol % of PDA and the dianhydride component comprises 20-100 mol % of BPDA.

It is also preferred that in the insulating coating material the dianhydride component further comprises 50 mol % or lower of 3,3',4,4'-benzophenonetetracarboxylic dianhydride (BTDA).

It is preferred that an insulating film used for an insulating coating material related to the present embodiment has a stress at 5% strain of 180 MPa or greater and a stress at 15% strain of 225 MPa or greater, wherein the stress at 15% strain is greater than the stress at 5% strain, having properties of both "high yield strength" and "high resistance against plastic deformation." As described in the first embodiment, using an insulating film having properties of both "high yield strength" and "high resistance against plastic deformation" enables to obtain an insulating coating material with excellent abrasion resistance.

That is, it is preferred that, when measuring a tensile elasticity of a polyimide film used for the insulating film in accordance with ASTM D882, a stress at 5% strain is 180 MPa or greater, that a stress at 10% strain is 210 MPa or greater, and that a stress at 15% strain is 225 MPa or greater, all of which are in a relationship that the higher the strain, the greater the corresponding stress, e.g., stress at 15% strain>stress at 10% strain>stress at 5% strain.

An insulating coating material related to the present embodiment is proved by the later described Examples 5-11 and Comparative Examples 3-7. Although Examples 7-11 and Comparative Examples 6-7 do not directly assess abrasion resistance, they assess abrasion resistance by a stress at 5% strain and a stress at 15% strain as a benchmark, since it is understood that a stress at 5% strain and a stress at 15% strain correlate with abrasion resistance. As needed, it may be assessed by using a stress at 10% strain, a stress at 20% strain, and a stress at 25% strain. It is noted for the record that the present inventors acknowledge that there may be a case where elasticity does not associate with abrasion resistance as described in Comparative Example 2, and that there may be a case where rupture strength does not associate with abrasion resistance as described in Comparative Example 3.

In addition, the following examples may be raised as a preferred embodiment of a polyimide film that may be used for an insulating coating material related to the present embodiment.

The polyimide film is obtained by reacting preferably 55-100 mol % of BPDA as a dianhydride component and 75-100 mol % of PDA as a diamine component, more preferably 75-100 mol % of BPDA as a dianhydride component and 80-100 mol % of PDA as a diamine component, yet more preferably 80-100 mol % of BPDA as a dianhydride component and 90-100 mol % of PDA as a diamine component.

The polyimide film is obtained by reacting preferably 50 mol % or lower of BTDA, more preferably 40 mol % or lower of BTDA, more preferably 30 mol % or lower of BTDA, and more preferably 20 mol % or lower of BTDA.

That is, the present embodiment includes a polyimide film obtained by reacting not to mention BPDA/PDA=100/100 but approximately 15% of BTDA. Furthermore, it must be noted for the record in view of the aforementioned matters that the present embodiment includes a polyimide film varied within the range of creative capacity for one of ordinary skill in the art.

In terms of the polyimide film, the total molar amount of BPDA, PMDA and PDA is preferably 150 mol % or greater; the total molar amount of BPDA, PMDA and PDA is more preferably 170 mol % or greater; and the total molar amount of BPDA, PMDA and PDA is further preferred to be 180 mol % or greater.

The polyimide film is obtained by reacting as a dianhydride component preferably 0-45 mol % of PMDA, more preferably 0-35 mol % of PMDA, yet more preferably 0-25 mol % of PMDA. In other words, the polyimide film is obtained by reacting as a dianhydride component preferably 45 mol % or lower of PMDA, more preferably 35 mol % or lower of PMDA, yet more preferably 25 mol % or lower of PMDA.

The polyimide film is obtained by reacting as a diamine component preferably 0-35 mol % of ODA, more preferably 0-20 mol % of ODA, yet more preferably 0-15 mol % of ODA. In other words, the polyimide film is obtained by reacting as a diamine component preferably 35 mol % or lower of ODA, more preferably 20 mol % or lower of ODA, further preferred to be 15 mol % or lower of ODA.

It is preferred that an insulating film used for an insulating coating material related to the present embodiment has a stress at 5% strain of 180 MPa or greater and a stress at 15% strain of 225 MPa or greater, wherein the stress at 15% strain is greater than the stress at 5% strain, having properties of both "high yield strength" and "high resistance against plastic deformation." It is so preferred since it expresses excellent abrasion resistance when used as an insulating film for an insulating coating material.

Fourth Embodiment

Other embodiment of an insulating coating material related to the present invention is described as follows. The third embodiment is described merely by a part different from the first embodiment, like the second and third embodiments. In terms of those not particularly described in this embodiment, the description in the first embodiment is incorporated herein as a matter common to the first embodiment.

A method for producing an insulating coating material comprising: an insulating film that is a polyimide film, the method comprising:

forming the polyimide film by reacting a diamine component and a dianhydride component to form a polyamide acid, and imidizing the polyamide acid to form the polyimide film, wherein the polyamide acid is obtained by a production method comprising:

(A) a step of reacting a dianhydride component and a diamine component in an organic polar solvent, wherein one component has an excess molar amount than the other, to obtain a prepolymer having an amino group or a dianhydride group at both terminal ends; and (B) a step of synthesizing the polyamide acid by reacting the prepolymer obtained in the step (A) with a dianhydride component and a diamine component, wherein a total molar amount of dianhydride components in steps (A) and (B) is equimolar with a total molar amount of diamine components in steps (A) and (B), and forming the adhesive layer on the insulating film, wherein an ether amount ranges from 35.0 mol % to 70.0 mol % based on a total molar amount of dianhydride components and diamine components used in the step (A) of 100 mol %, and wherein the ether amount is a sum of mol % of oxygen atoms derived from an ether bond contained in dianhydride components and diamine components used at the step (A).

That is, "ether amount" in the present specification is a sum of mol % of oxygen atoms derived from an ether bond contained in dianhydride components and diamine components used in the step (A) based on a total molar amount of dianhydride components and diamine components used in the step (A) of 100 mol %. For example in the case of Example 12 (Synthesis Example 16), dianhydride components and diamine components used in the step (A) are 26.3 mol % of BTDA, 42.1 mol % of ODA, 21.0 mol % of BPDA, and 10.5 mol % of BAPP, based on a total molar amount of dianhydride components and diamine components used in the step (A) of 100 mol %. Among those, dianhydride components BTDA and BPDA do not contain ether bond, while of diamine components BAPP contains 2 ether bonds in its repeating unit and ODA contains 1 ether bond in its repeating unit. There is 1 oxygen atom derived from an ether bond per ether bond in a repeating unit. Therefore, the ether amount in the step (A) can be calculated as follows:

$$(26.3*0)+(42.1*1)+(21.0*0)+(10.5*2)=63.1 \text{ (mol \%)}.$$

The ether amount ranges preferably from 35.0 mol % to 70.0 mol %, more preferably from 40.0 mol % to 70.0 mol %, yet more preferably from 45.0 mol % to 65.0 mol %. As long as it is within such ranges, it is possible to obtain an insulating coating material with excellent abrasion resistance.

In terms of a method for producing an insulating coating material related to the present embodiment, it is also preferred that in the step (B) dianhydride components and diamine components used therein comprise 70 mol % or greater of PDA and PMDA based on a total molar amount of dianhydride components and diamine components of 100 mol % used therein. In addition, a prepolymer formed in the step (A) is obtained through either a step of using a molar amount of diamine components (a) and relatively a lower molar amount of dianhydride components (b) to form a prepolymer having a diamine component at both terminal ends, or a step of using diamine components (a) and relatively excessive molar amounts of dianhydride components (b) to form a prepolymer having a dianhydride component at both terminal ends. It is preferred:

if (a)<(b), then 0.81<(a)/(b)<0.99 is satisfied; and
if (a)>(b), then 0.81<(b)/(a)<0.99 is satisfied.

It is more preferred:

if (a)<(b), then 0.82<(a)/(b)<0.99 is satisfied; and
if (a)>(b), then 0.82<(b)/(a)<0.99 is satisfied.

(a)/(b) or (b)/(a) reflects a repeating unit n for a prepolymer. In other words, this repeating unit n may be controlled by ratio of loading for (a)/(b) or (b)/(a). Although the repeating unit n may be affected by stirring efficiency etc., the present embodiment discounts such possibilities and use a repeating unit n that is theoretically drawn from a molar ratio of (a)/(b) or (b)/(a). A repeating unit n for prepolymer is preferably 3-99, more preferably 4-99, yet more preferably 4.1-99, and most preferably 4.5-99. As long as a repeating unit n is within such ranges, an ideal character is easy to be expressed.

It is preferred that an insulating film used for an insulating coating material related to the present embodiment has a stress at 5% strain of 180 MPa or greater and a stress at 15% strain of 225 MPa or greater, the stress at 15% strain is greater than the stress at 5% strain, having properties of both "high yield strength" and "high resistance against plastic deformation." As described in the first embodiment, using an insulating film having properties of both "high yield strength" and "high resistance against plastic deformation" enables to obtain an insulating coating material with excellent abrasion resistance.

That is, when measuring a tensile elasticity of a polyimide film used for the insulating film in accordance with ASTM D882, it is preferred that a stress at 5% strain is 180 MPa or greater, that a stress at 10% strain is 210 MPa or greater, and that a stress at 15% strain is 225 MPa or greater, all of which are in a relationship that the higher the strain, the greater the corresponding stress, e.g., stress at 15% strain>stress at 10% strain>stress at 5% strain.

An insulating coating material related to the fourth embodiment is proved by the later described Examples 1-4, 12-26 and Comparative Examples 1, 2, 8-12. Although Examples 12-26 and Comparative Examples 8-12 do not directly assess abrasion resistance, they assess abrasion resistance by a stress at 5% strain and a stress at 15% strain as a benchmark, since it is understood that a stress at 5% strain and a stress at 15% strain correlate with abrasion resistance. As needed, it may be assessed by using a stress at 10% strain, a stress at 20% strain, and a stress at 25% strain.

As a method for producing a polyimide film related to the present embodiment, for example, it may include:

(i) the step of using diamine components (a) and relatively a lower molar amount of dianhydride components (b) to form a prepolymer having an amino group at both terminal ends;

(ii) a step of synthesizing the polyamide acid by reacting the prepolymer obtained in the step (i) with an anhydride component and a diamine component, wherein a total molar amount of dianhydride components in steps (ii) and (ii) is equimolar with a total molar amount of diamine components in steps (i) and (ii); and (iii) the step of casting a film-forming dope comprising the polyamide precursor solution to imidize chemically and/or thermally.

As long as the above three steps are included, it may combine with any variety of methods.

A separate method may include:

(iv) the step of using diamine components (a) and relatively an excess molar amount of dianhydride components (b) to form a prepolymer having an anhydride group at both terminal ends;

(v) a step of synthesizing the polyamide acid by reacting the prepolymer obtained in the step (iv) with a anhydride component and a diamine component, wherein a total molar amount of dianhydride components in steps (iv) and (v) is equimolar with a total molar amount of diamine components in steps (iv) and (v); and (vi) the step of casting a film-forming dope comprising the non-thermal plastic polyamide precursor solution to imidizing chemically and/or thermally.

The steps (A) and (B) are described in details as follows.

Step (A)

The step (A) uses diamine components (a) and relatively a lower molar amount of dianhydride components (b) to form a prepolymer having an amino group at both terminal ends. Alternatively, it uses diamine components (a) and relatively excessive molar amounts of dianhydride components (b) to form a prepolymer having an anhydride group at both terminal ends. Here, it is preferred to select diamine components (a) and dianhydride components (b) so that a polyimide obtained by an equimolar reaction of them can be a polyimide of a flexible chemical structure.

"A flexible chemical structure" is intended to mean as exhibiting flexibility at high temperature. Specifically, a prepolymer derived from polyimide that exhibits flexibility at high temperature may be defined as one that reaches 50 MPa or lower at 300-450° C., when measuring a storage elastic modulus on the film of high-molecular weight body by a dynamic viscoelasticity measuring device (DMA) at a frequency of 5 Hz and a temperature rate of 3° C./min. It is more preferred that an inflection point exists between 250-350° C. when expressing behaviors of a storage elastic modulus with a chart. In the case where a prepolymer formed by the step (A) exhibits flexibility at high temperature, it may stably produce an insulating film with excellent abrasion resistance, which is an effect of the present invention. On another front, in the case where a prepolymer formed by the step (A) exhibits flexibility at lower temperature than the above temperature range, there may be a case where a stress at x % strain decreases.

Specifically, diamine components (a) and dianhydride components (b) are selected by confirming whether or not a polyimide obtained by an equimolar reaction of diamine components (a) and anhydride components (b) exhibits the behavior of a storage elastic modulus. It is either by reacting the (a) components so selected and relatively a lower molar amount of (b) components in an organic polar solvent to form a prepolymer having an amino group at both terminal ends or by reacting the (a) components and relatively excessive molar amounts of (b) components in an organic polar solvent to form a prepolymer having an anhydride group at both terminal ends. A prepolymer obtained thereby becomes a polyimide block component that exhibits flexibility at high temperature.

In the fourth embodiment, a ratio of prepolymer components is calculated in accordance with formula (1) in the case of synthesizing by use of excessive molar amounts of diamine components than dianhydride components, or with formula (2) in the case of synthesizing by use of excessive molar amounts of dianhydride components than diamine components:

$$(\text{prepolymer content})=a/P*100 \quad (1)$$

a: amount of (a) components (mol)
P: the total diamine amount (mol)

$$(\text{prepolymer content})=b/Q*100 \quad (2)$$

b: amount of (b) components (mol)
Q: the total dianhydride component amount (mol).

It is preferred that in the step (A) the dianhydride component comprises at least one selected from a group consisting of 3,3',4,4'-benzophenonetetracarboxylic dianhydride (BTDA) and 3,3',4,4'-biphenyltetracarboxylic dianhydride (BPDA).

Step (B)

The step (B) uses a prepolymer obtained by the step (A), and a dianhydride component and a diamine component, to synthesize a polyimide acid (polyimide precursor). A polyimide precursor solution obtained by the step (B) preferably selects anhydride components and diamine components so that the corresponding polyimide can become non-thermal plastic polyimide. Whether or not it is a non-thermal plastic polyimide may be determined by appearance after heat-processing a film fixed by a metal frame for one minute at 450° C., which may be confirmed by not being melted or no wrinkling to maintain the appearance. At the step (B), as long as a total molar amount of dianhydride components in steps (A) and (B) is equimolar with a total molar amount of diamine components in steps (A) and (B), it does not matter if a polyimide precursor is obtained by two steps or more.

A polyamide acid solution so obtained is at a concentration of generally 5-35 wt %, preferably 10-30 wt %. In the case of a concentration within such ranges, appropriate molecular weight and solution viscosity are obtained.

In the present embodiment, a preferred example is as follows in terms of diamine and dianhydride used for producing a non-thermal plastic polyimide precursor by a reaction with a prepolymer. Although it may not be categorically defined because a variety of properties varies depending on a combination of diamine and dianhydrade, a rigid component is preferred as diamine by using paraphenylenediamine and its derivative or benzidine and its derivative as a primary component. By using such diamine having a rigid structure, it enables to get a non-thermal plastic property and to easily achieve high elasticity. In terms of an acid component, although there are pyromellitic dianhydride, 2,3,7,8-naphtalene tetracarboxylic acid dianhydride, etc., it is preferred to use pyromellitic dianhydride as a primary component. Pyromellitic dianhydride tends to provide a non-thermal plastic polyimide due to its rigid structure as well known.

In the present embodiment, it is preferred, from a perspective of easy polymerization control and of convenience of a device, to use a method for polymerizing a non-thermal plastic polyimide precursor by first synthesizing a prepolymer, then adding diamine and dianhydride at a molar fraction properly designed.

A preferred solvent may be anything as long as it dissolves a polyamide acid, such as an amid series solvent, i.e., N,N-dimethylformamide, N,N-dimethylacetamide, N-methyl-2-pyrrolidone, etc., among which N,N-dimethylformamide and N,N-dimethylacetamide are particularly preferred.

Furthermore, as a preferred example of a polyimide film that can be used for an insulating coating material related to the present embodiment may be raised as follows.

It is preferred that the polyimide film is obtained from polymerization of BTDA as a dianhydride component, wherein the total amount of BTDA is at a ratio of 10-55 mol % of dianhydride.

It is preferred that the polyimide film is obtained from polymerization of PMDA as an essential component and BPDA as an optional component as a dianhydride component, and that the total amount of PMDA and BPDA comprised is 45-84 mol % or lower of the total amount of dianhydride components. BPDA is an optional component, thus it may not be comprised. In such a case, PMDA is comprised by 45-84 mol % or lower based on the total amount of dianhydride components.

In order to increase a tear strength while low-temperature heating, it is preferred that a solid content concentration of a solution comprising the polyamide acid is 16.5% or lower.

In the step (A), it is preferred that dianhydride components and diamine components used therein comprise 45-65 mol % or lower of dianhydride components and diamine components containing an ether bond based on a total molar amount of dianhydride components and diamine components of 100 mol % used therein.

In the step (A), it is preferred that if (a)<(b), then it satisfies 0.83<(a)/(b)<0.95, and that if (a)>(b), then it satisfies 0.83<(b)/(a)<0.99. It is further preferred that if (a)<(b), then it satisfies 0.86<(a)/(b)<0.95, and that if (a)>(b), then it satisfies 0.85<(b)/(a)<0.99.

In the step (B), it is preferred that dianhydride components and diamine components used therein comprise 75 mol % or greater of PDA and PMDA based on a total molar amount of dianhydride components and diamine components of 100 mol % used therein.

It is preferred that dianhydride components to form the polyimide film comprise 17-52 mol % or lower of BTDA based on a total molar amount of dianhydride components of 100 mol % used therein.

It is preferred that dianhydride components to form the polyimide film comprise 48-78 mol % or lower of PMDA and BPDA based on a total molar amount of dianhydride components of 100 mol % used therein.

It is preferred that a solid content concentration of a solution comprising the polyamide acid is 16.0% or lower.

A prepolymer component formed by the step (A) is comprised in a polyimide film preferably by 20-65 mol %, more preferably by 30-60 mol %, further and particularly preferably by 35-55 mol %.

In addition, when producing the polyimide film continuously, if a film's tear strength while heating is low, it will be easy to cause problems such as cracking, thus not suitable for continuous production. Therefore, it is preferred that a tear strength of a film while heating is 0.95 N/mm or greater, when measured in accordance with the trouser tear test JIS K7128-1. The measurement was performed by using a film obtained by casting and applying a solution comprising polyamide acid onto an aluminum foil using a comma coater, then by heating a polymer film so obtained at 110° C. for 90 seconds to obtain a self-supporting gel membrane stripped from the aluminum foil, by fixing the gel film so obtained to a metal frame, then by heating it at 250° C. for 15 seconds to obtain a film (in thickness of 17-22 μm).

A tear strength of a film while heating measured in accordance with the trouser tear test JIS K7128-1 is further preferred to be 1.3 N/mm or greater, and particularly preferred to be 1.5 N/mm or greater.

It is preferred that a polyimide film in the above embodiment has a stress at 5% strain of 180 MPa or greater and a stress at 15% strain of 225 MPa or greater, the stress at 15% strain is greater than the stress at 5% strain, having properties of both "high yield strength" and "high resistance against plastic deformation." It is so preferred since it expresses excellent abrasion resistance when used as an insulating film for an insulating coating material.

The present invention may also include a method for producing an insulating cable including the above method for producing an insulating coating material as one step, and a step of wrapping the insulating coating material obtained by the above method around an electric conductor.

In addition, embodiments of the present invention include:

(1) An insulating coating material comprising: an insulating film comprising polyimide resin, wherein the insulating material has, when a tensile elasticity is measured in accordance with ASTM D882, a stress at 5% strain of 180 MPa or greater and a stress at 15% strain of 225 MPa or greater, the stress at 15% strain is greater than the stress at 5% strain. In some embodiments, the insulating coating material includes an adhesive layer comprising fluororesin.

(2) An insulating coating material in accordance with (1), wherein the insulating material has a stress at 10% strain of 210 MPa or greater, when a tensile elasticity is measured in accordance with ASTM D882.

(3) An insulating coating material in accordance with (1) or (2), wherein the insulating film is a polyimide film obtained by reacting a diamine component and a dianhydride component to form a polyamide acid, and imidizing the polyamide acid to form the polyimide film, wherein the dianhydride component comprises at least one selected from a group consisting of 3,3',4,4'-benzophenonetetracarboxylic dianhydride (BTDA) and 3,3',4,4'-biphenyltetracarboxylic dianhydride (BPDA).

(4) An insulating coating material having an insulating film comprising polyimide resin,
wherein a thickness of the insulating film (μm) and abrasion resistance (cycle) satisfy a relationship of the formula (A):

Thickness of insulating film<6.05*ln(abrasion resistance)+11.0,     (A)

wherein the abrasion resistance is an average of 5 measurements performed on an assessment wire in accordance with the British Standard Aerospace Series BS EN 3475-503, wherein the assessment wire is a laminated body the laminated body comprising, in order, layers of an insulating film, tetrafluoroethylene hexafluoropropylene copolymer (FEP) film (12 μm), 1 mmφ conductive wire, an FEP film (12 μm) and an insulating film, wherein the laminated body is pressurized between adjacent SUS plates, each SUS plate having a buffer material between the SUS plate and the laminated body, at a pressure of 78 kgf/cm$^2$ at 280° C. for 10 minutes, to obtain the assessment wire. In some embodiments, the insulating coating material includes an adhesive layer comprising fluororesin.

(5) An insulating coating material in accordance with (4), wherein the insulating film is a polyimide film obtained by reacting a diamine component and a dianhydride component to form a polyamide acid, and imidizing the polyamide acid to form the polyimide film, wherein the dianhydride component comprises at least one selected from a group consisting of 3,3',4,4'-benzophenonetetracarboxylic dianhydride (BTDA) and 3,3',4,4'-biphenyltetracarboxylic dianhydride (BPDA).

(6) An insulating coating material having an insulating film comprising polyimide resin, wherein the insulating film is a polyimide film obtained by reacting a diamine component and a dianhydride component to form a polyamide acid, and imidizing the polyamide acid to form the polyimide film, wherein the diamine component comprises 65-100 mol % of p-phenylenediamine (PDA) and the dianhydride component comprises 20-100 mol % of 3,3',4,4'-biphenyl-tetracarboxylic dianhydride (BPDA). In some embodiments, the insulating coating material includes an adhesive layer comprising fluororesin.

(7) An insulating coating material in accordance with (6), the dianhydride component further comprising 50 mol % or lower of 3,3',4,4'-benzophenonetetracarboxylic dianhydride (BTDA).

(8) A method for producing an insulating coating material having an insulating film, wherein the insulating film is a polyimide film, the method comprising:
forming the polyimide film by reacting a diamine component and a dianhydride component to form a polyamide acid, and imidizing the polyamide acid to form the polyimide film, wherein the polyamide acid is obtained by a production method comprising:
(A) a step of reacting a dianhydride component and a diamine component in an organic polar solvent, wherein one component has an excess molar amount than the other, to obtain a prepolymer having an amino group or a dianhydride group at both terminal ends; and
(B) a step of synthesizing the polyamide acid by reacting the prepolymer obtained in the step (A) with a dianhydride component and a diamine component, where a total molar amount of the diamine components in steps (A) and (B) is equimolar with a total molar amount of the dianhydride components in steps (A) and (B),
wherein an ether amount ranges from 35.0 mol % to 70.0 mol % based on a total molar amount of dianhydride components and diamine components used in the step (A) of 100 mol %, and wherein the ether amount is a sum of mol % of oxygen atoms derived from an ether bond contained in dianhydride components and diamine components used in the step (A). In some embodiments, the insulating coating material further comprises an adhesive layer, and the method further comprises forming the adhesive layer on the insulating film. In some embodiments, the adhesive layer comprises fluororesin.

(9) A method for producing an insulated coated material in accordance with (8), wherein in the step (A) the dianhydride component comprises at least one selected from a group consisting of 3,3',4,4'-benzophenonetetracarboxylic dianhydride (BTDA) and 3,3',4,4'-biphenyltetracarboxylic dianhydride (BPDA).

(10) A method for producing an insulated coated material in accordance with (8) or (9), wherein in the step (B) dianhydride components and diamine components used therein comprise 70 mol % or greater of p-phenylenediamine (PDA) and pyromellitic dianhydride (PMDA) based on a total molar amount of dianhydride components and diamine components of 100 mol % used therein.

(11) A method for producing an insulated coated material in accordance with one of (8)-(10), wherein a prepolymer formed in the step (A) is obtained through either a step of using diamine components (a) and relatively a lower molar amount of dianhydride components (b) to form a prepolymer having a diamine component at both terminal ends, or a step of using diamine components (a) and relatively excessive molar amounts of dianhydride components (b) to form a prepolymer having a dianhydride component at both terminal ends, and if (a)<(b), then 0.81<(a)/(b)<0.99 is satisfied, and
if (a)>(b), then 0.81<(b)/(a)<0.99 is satisfied.

(12) An insulated coating film in accordance with one of (1)-(7), a thickness of the insulating film being 25 μm or lower.

(13) An insulating cable having an insulating coating material in accordance with one of (1)-(7), (12).

(14) An insulating cable in accordance with (13), wherein the insulating coating material is wrapped around an electric conductor.

(15) A method for producing an insulating cable, comprising: forming an insulating coating material in accordance with one of the methods for producing an insulating coating material described in (8)-(11) included as one step; and wrapping an insulating coating material obtained by the method for producing an insulating coating material around an electric conductor.

The present invention also includes a method for producing an insulating coating material in accordance with one of (8)-(11), wherein a thickness of the insulating film is 25 μm or lower.

The present invention is not limited to particular embodiments described above. To the extent defined by the appended claims, numerous modifications may be made, and any embodiment obtained by combining technical means disclosed herein in different embodiments may fall within the technical scope of the present invention. That is, an embodiment that combines a matter described in the first embodiment with a matter described in one of the second to fourth embodiments may be included in the present invention. Or it may combine so with two of the second to fourth embodiments. Although the present invention is explained in further details as follows by examples, it is to be understood that the present invention is not limited to those examples.

EXAMPLES

Mechanical Property: Measurement of a Stress at x % Strain

A stress at x % strain may be sought by measurement data of a tensile elasticity. A tensile elasticity is performed in accordance with ASTM D882. For the measurement, AUTOGRAPH AGS-J made by Shimadzu Corporation was used (sample measurement range; width 15 mm, distance between grippers; 100 mm, tension rate; 200 mm/min).

Mechanical Property: Tear Strength while Low-Temperature Heating

Tear strength while low-temperature heating was measured in accordance with the trouser tear test JIS K7128-1. Tear strength while low-temperature heating was assessed by using a film while heating. The film while heating was obtained by casting and applying a solution comprising polyamide acid onto an aluminum foil using a comma coater, then by heating a polymer film so obtained at 110° C. for 90 seconds to obtain a self-supporting gel membrane stripped from the aluminum foil, by fixing the gel film so obtained to a metal frame, then by heating it at 250° C. for 15 seconds to obtain a film (in thickness of 17-22 μm).

Wire Characteristic: Measurement of Assessment Wire

In terms of a polyimide film for assessment, a laminated body was first obtained in layers of an insulating film, tetrafluoroethylene hexafluoropropylene copolymer (FEP) film (12 μm), 1 mmϕ conductive wire, an FEP film (12 μm) and an insulating film. The laminated body was is pressurized between adjacent SUS plates, each SUS plate having a buffer material between the SUS plate and the laminated body, at a pressure of 78 kgf/cm$^2$ at 280° C. for 10 minutes to obtain an assessment wire. Abrasion resistance was measured on the assessments wire so obtained, in accordance with the British Standard Aerospace Series BS EN 3475-503. The measurement was performed 5 times, an average of the 5 measurements is regarded as abrasion resistance. In terms of the measurement, REPEATED SCRAPE ABRASION TESTER (CAT 158L238G1) made by Wellman, Inc. was used. For the conductive wire, a high performance conductor nickel coated copper (AWG: 20, CONST: 19/32) made by Phelps Dodge Corporation was used. In order to prevent an impact by thickness dispersion when determining a result of abrasion resistance, polyimide films were measured at 50 μm thickness in most experimental examples herein. However, other thicknesses were also used when measuring abrasion resistance.

A method for preparing a polyimide film from a polyimide precursor was performed as follows, unless there is any specific description in an example.

Method for Preparing a Polyimide in Thickness of 12-13 μm

A polyimide precursor (90 g) was added by 40.5 g of a cure agent comprising acetic anhydride, isoquinoline and DMF, which was stirred and defoam at a temperature of 0° C. or lower, then casted and applied onto aluminum foil using a comma coater. After this polymer film was heated at 120° C. for 100 seconds, a self-supporting gel membrane was stripped from the aluminum foil to fix it to a metal frame, then by drying and imidizing at 250° C. for 15 seconds, 350° C. for 15 seconds, 450° C. for 100 seconds, a polyimide film in thickness of 12-13 μm was so obtained.

Method for Preparing a Polyimide Film in Thickness of 15-21 μm

A polyimide precursor (90 g) was added to 40.5 g of a cure agent comprising acetic anhydride, isoquinoline and DMF, which was stirred and defoam at a temperature of 0° C. or lower, then casted and applied onto aluminum foil using a comma coater. After this polymer film was heated at 120° C. for 110 seconds, a self-supporting gel membrane was stripped from the aluminum foil to fix it to a metal frame, then by drying and imidizing at 250° C. for 15 seconds, 350° C. for 15 seconds, 450° C. for 120 seconds, a polyimide film in thickness of 15-21 μm was so obtained.

Method for Preparing a Polyimide Film in Thickness of 24-26 μm

A polyimide precursor (90 g) was added by 40.5 g of a cure agent comprising acetic anhydride, isoquinoline and DMF, which was stirred and defoam at a temperature of 0° C. or lower, then casted and applied onto aluminum foil using a comma coater. After this polymer film was heated at 110° C. for 150 seconds, a self-supporting gel membrane was stripped from the aluminum foil to fix it to a metal frame, then by drying and imidizing at 250° C. for 20 seconds, 350° C. for 20 seconds, 450° C. for 120 seconds, a polyimide film in thickness of 24-26 μm was so obtained.

Method for Preparing a Polyimide Film in Thickness of 49-51 μm

A polyimide precursor (90 g) was added by 40.5 g of a cure agent comprising acetic anhydride, isoquinoline and DMF, which was stirred and defoam at a temperature of 0°

C. or lower, then casted and applied onto aluminum foil using a comma coater. After this polymer film was heated at 90° C. for 300 seconds, a self-supporting gel membrane was stripped from the aluminum foil to fix it to a metal frame, then by drying and imidizing at 150° C. for 60 seconds, 250° C. for 60 seconds, 350° C. for 60 seconds, 450° C. for 150 seconds, a polyimide film in thickness of 49-51 μm was so obtained.

Synthesis Example 1: Synthesis of Polyimide Precursor 1

655.9 g of DMF is input into a 2,000 ml-content glass flask, to which were added 46.1 g (143.1 mmol) of 3,3',4,4'-benzophenonetetracarboxylic dianhydride (BTDA), 25.8 g (128.8 mmol) of 4,4'-oxydianiline (ODA), and mixed for 1 hour. Further, 17.0 g (157.2 mmol) of p-phenylenediamine (PDA), and 29.3 g (134.3 mmol) of pyromellitic dianhydride (PMDA) were added, and mixed for 1 hour. The reaction solution was added gradually by a DMF solution of PMDA that was separately arranged (8 wt %) until a viscosity at 23° C. reaches 2,500 poise when the addition was stopped. Polyimide Precursor 1 was so obtained.

TABLES 1, 3 depict mol % of each of dianhydride components and diamine components used in the entire steps.

When the total molar amount of dianhydride components and diamine components used in the step (A) is set as 100 mol %, dianhydride components and diamine components used in the step (A) are 47.4 mol % of ODA and 52.6 mol % of BTDA. Therefore, ether amount is (47.4*1)+(52.6*0) =47.4 mol %.

Synthesis Example 2: Synthesis of Polyimide Precursor 2

655.9 g of DMF is input into a 2,000 ml-content glass flask, to which were added 28.7 g (143.3 mmol) of ODA, 41.5 g (128.8 mmol) of BTDA, which was mixed for 1 hour. Further, 15.5 g (143.3 mmol) of PDA, 32.5 g (149.0 mmol) of PMDA were added, and mixed for 1 hour. The reaction solution was added gradually by a DMF solution of PMDA that was separately arranged (8 wt %) until a viscosity at 23° C. reaches 2,500 poise when the addition was stopped. Polyimide Precursor 2 was so obtained.

TABLES 1, 3 depict mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.7 mol %.

Synthesis Example 3: Synthesis of Polyimide Precursor 3

655.5 g of DMF is input into a 2,000 ml-content glass flask, to which were added 29.1 g (145.3 mmol) of ODA, 17.1 g (58.1 mmol) of 3,3',4,4'-biphenyl-tetracarboxylic dianhydride (BPDA) and 23.4 g (72.6 mmol) of BTDA, which was mixed for 1 hour. Further, 15.7 g (145.2 mmol) of PDA and 32.9 g (150.8 mmol) of PMDA were added, and mixed for 1 hour. The reaction solution was added gradually by a DMF solution of PMDA that was separately arranged (8 wt %) until a viscosity at 23° C. reaches 2,500 poise when the addition was stopped. Polyimide Precursor 3 was so obtained.

TABLES 1, 3 depict mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.6 mol %.

Synthesis Example 4: Synthesis of Polyimide Precursor 4

655.9 g of DMF is input into a 2,000 ml-content glass flask, to which were added 29.2 g (145.8 mmol) of ODA, 17.2 g (58.5 mmol) of BPDA and 21.6 g (67.0 mmol) of BTDA, which was mixed for 1 hour. Further, 15.8 g (146.1 mmol) of PDA and 34.4 g (157.7 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 4 was so obtained.

TABLES 1, 3 depict mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 53.7 mol %.

Synthesis Example 5: Synthesis of Polyimide Precursor 5

667.9 g of DMF is input into a 2,000 ml-content glass flask, to which were added 84.3 g (286.5 mmol) of BPDA, 8.7 g (43.4 mmol) of ODA and 25.6 g (236.7 mmol) of PDA, which was mixed for 1 hour. The reaction solution was added gradually by a DMF solution of PDA that was separately arranged (7 wt %) until a viscosity reaches 2,500 poise when the addition was stopped. Polyimide Precursor 5 was so obtained.

TABLES 1, 2 depict mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 13.0 mol %.

Synthesis Example 6: Synthesis of Polyimide Precursor 6

709.3 g of DMF is input into a 2,000 ml-content glass flask, to which were added 93.2 g (316.8 mmol) of BPDA and 33.2 g (307.0 mmol) of PDA, which was mixed for 1 hour. The reaction solution was added gradually by a DMF solution of PDA that was separately arranged (7 wt %) until a viscosity reaches 2,500 poise when the addition was stopped. Polyimide Precursor 6 was so obtained.

TABLES 1, 2 depict mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 6.0 mol %.

Synthesis Example 7: Synthesis of Polyimide Precursor 7

655.5 g of DMF is input into a 2,000 ml-content glass flask, to which were added 29.1 g (145.3 mmol) of ODA, 15.7 g (145.2 mmol) of PDA, 17.1 g (58.1 mmol) of BPDA, 23.4 g (72.6 mmol) of BTDA and 32.9 g (150.8 mmol) of PMDA, which was mixed for 1 hour. The reaction solution was added gradually by a DMF solution of PMDA that was separately arranged (8 wt %) until a viscosity at 23° C. reaches 2,500 poise when the addition was stopped. Polyimide Precursor 7 was so obtained.

TABLES 1, 3 depict mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.5 mol %.

Synthesis Example 8: Synthesis of Polyimide Precursor 8

637.6 g of DMF is input into a 2,000 ml-content glass flask, to which were added 36.7 g (89.4 mmol) of 2,2-bis [4-(4-aminophenoxy)phenyl]propane (BAPP), 11.9 g (59.4 mmol) of ODA, 19.2 g (59.6 mmol) of BTDA and 16.3 g (74.7 mmol) of PMDA, which was mixed for 1 hour. Further, 16.1 g (148.9 mmol) of PDA and 33.8 g (155.0 mmol) of PMDA were added, and mixed for 1 hour. The reaction solution was added gradually by a DMF solution of PMDA that was separately arranged (8 wt %) until a viscosity at 23° C. reaches 2,500 poise when the addition was stopped. Polyimide Precursor 8 was so obtained.

TABLES 1, 3 depict mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 84.1 mol %.

Example 1

By using Polyimide Precursor 1 (90 g) that was obtained by Synthesis Example 1 and a cure agent comprising acetic anhydride, isoquinoline and DMF (weight ratios of acetic anhydride, isoquinoline, DMF are 11.72, 4.36, 24.43, respectively), polyimide films were obtained in thickness of 19 μm. Separately, a polyimide film was obtained in thickness of 50 μm. A stress at x % strain was measured by use of the polyimide film in thickness of 19 μm. Abrasion resistance was measured by processing the polyimide film in thickness of 50 μm as an assessment wire. The results are shown in TABLE 1. The elastic modulus was 8.9 GPa.

Example 2

A polyimide film was obtained similar to Example 1, except that Polyimide Precursor 2 obtained by Synthesis Example 2 was used. Among polyimide films obtained, a stress at x % strain was measured by use of the polyimide film in thickness of 17 μm. Abrasion resistance was measured by processing the polyimide film in thicknesses of 12.5 μm, 17 μm, 25 μm, and 50 μm as an assessment wire. The results are shown in TABLE 1. The elastic modulus was 8.4 GPa.

Example 3

A polyimide film was obtained similar to Example 1, except that Polyimide Precursor 3 obtained by Synthesis Example 3 was used. Among polyimide films obtained, a stress at x % strain was measured by use of the polyimide film in thickness of 16 μm. Abrasion resistance was measured by processing the polyimide film in thickness of 50 μm as an assessment wire. The results are shown in TABLE 1. Abrasion resistance was also measured for the polyimide film in thickness of 16 μm processed as an assessment wire, which was 3.8 cycles. The elastic modulus was 8.7 GPa.

Example 4

A polyimide film was obtained similar to Example 1, except that Polyimide Precursor 4 obtained by Synthesis Example 4 was used. Among polyimide films obtained, a stress at x % strain was measured by use of the polyimide film in thickness of 19 μm. Abrasion resistance was measured by processing the polyimide film in thicknesses of 12.5 μm, 25 μm, and 50 μm as an assessment wire. The results are shown in TABLE 1. The elastic modulus was 8.09 GPa (it is expressed as 8.1 GPa when decimal points are rounded to one significant figure).

Example 5

By using Polyimide Precursor 5 obtained by Synthesis Example 5 and a cure agent comprising acetic anhydride, isoquinoline and DMF (weight ratios of acetic anhydride, isoquinoline, DMF are 17.23, 5.75, 17.52, respectively), polyimide films were obtained in thickness of 12.5 μm, 16 μm, 25 μm and 50 μm. A stress at x % strain was measured by use of the polyimide film in thickness of 16 μm. Abrasion resistance was measured by processing the polyimide films in thickness of 12.5 μm, 25 μm and 50 μm as an assessment wire. The results are shown in TABLE 1. The elastic modulus was 10.3 GPa.

Example 6

By using Polyimide Precursor 6 obtained by Synthesis Example 6 and the same cure agent as Example 5, polyimide films were obtained in thickness of 12.5 μm, 17 μm, 25 μm and 50 μm. A stress at x % strain was measured by use of the polyimide film in thickness of 17 μm. Abrasion resistance was measured by processing the polyimide films in thickness of 50 μm as an assessment wire. The results are shown in TABLE 1. The elastic modulus was 11.2 GPa.

Comparative Example 1

A polyimide film was obtained similar to Example 1, except that Polyimide Precursor 7 obtained by Synthesis Example 7 was used. Among polyimide films obtained, a stress at x % strain was measured by use of the polyimide film in thickness of 17 μm. Abrasion resistance was measured by processing the polyimide film in thickness of 50 μm as an assessment wire. The results are shown in TABLE 1. The elastic modulus was 5.8 GPa.

Comparative Example 2

A polyimide film was obtained similar to Example 1, except that Polyimide Precursor 8 obtained by Synthesis Example 8 was used. Among polyimide films obtained, a stress at x % strain was measured by use of the polyimide film in thickness of 17 μm. Abrasion resistance was measured by processing the polyimide film in thickness of 50 μm as an assessment wire. The results are shown in TABLE 1. The elastic modulus was 7.0 GPa.

Comparative Example 3

A commercially available polyimide film (Kapton E, made by du Pont) in thickness of 25 μm was used to measure a stress at x % strain. Abrasion resistance was measured by processing the polyimide film in thickness of 12.5 μm, 25 μm, and 50 μm as an assessment wire. The results are shown in TABLE 1. The elastic modulus was 6.1 GPa.

Comparative Example 4

A commercially available polyimide film (Apical NPI, made by Kaneka) in thickness of 25 μm was used to measure a stress at x % strain. Abrasion resistance was measured by processing the polyimide film in thickness of 12.5 μm, 25 μm, and 50 μm as an assessment wire. The results are shown in TABLE 1. The elastic modulus was 4.5 GPa.

Comparative Example 5

A commercially available polyimide film (Apical AH, made by Kaneka) in thickness of 19 μm was used to measure a stress at x % strain. Abrasion resistance was measured by processing the polyimide film in thickness of 12.5 μm, 19 μm, 25 μm, and 50 μm as an assessment wire. The results are shown in TABLE 1. The elastic modulus was 3.2 GPa.

As illustrated in TABLE 1 below, insulating coating materials by use of Examples 1-6 exhibit excellent abrasion resistance in comparison with any of Comparative Examples or the products commercially available at present.

TABLE 1

| Film | Polymer | Molar ratio | | | | | | | Polymerization Pattern |
|---|---|---|---|---|---|---|---|---|---|
| | | Diamine | | | | Dianhydride | | | |
| | | BAPP % | ODA % | PDA % | TPE-R % | PMDA % | BTDA % | BPDA % | |
| Ex. 1 | Synthesis Ex. 1 | 0 | 45 | 55 | 0 | 50 | 50 | 0 | Sequence |
| Ex. 2 | Synthesis Ex. 2 | 0 | 50 | 50 | 0 | 55 | 45 | 0 | Sequence |
| Ex. 3 | Synthesis Ex. 3 | 0 | 50 | 50 | 0 | 55 | 25 | 20 | Sequence |
| Ex. 4 | Synthesis Ex. 4 | 0 | 50 | 50 | 0 | 57 | 23 | 20 | Sequence |
| Ex. 5 | Synthesis Ex. 5 | 0 | 15 | 85 | 0 | 0 | 0 | 100 | Random |
| Ex. 6 | Synthesis Ex. 6 | 0 | 0 | 100 | 0 | 0 | 0 | 100 | Random |
| Comp Ex. 1 | Synthesis Ex. 7 | 0 | 50 | 50 | 0 | 55 | 25 | 20 | Random |
| Comp Ex. 2 | Synthesis Ex. 8 | 30 | 20 | 50 | 0 | 80 | 20 | 0 | Sequence |
| Comp Ex. 3 | Kapton E | — | — | — | — | — | — | — | — |
| Comp Ex. 4 | Apical NPI | — | — | — | — | — | — | — | — |
| Comp Ex. 5 | Apical AH | — | — | — | — | — | — | — | — |

| | Mechanical property | | | | | | | | Tear strength during low-temp heating (N/mm) |
|---|---|---|---|---|---|---|---|---|---|
| | Film thickness (μm) | Elasticity (GPa) | Stress (MPa) at Strain (%) | | | | | | |
| | | | 5% | 10% | 15% | 20% | 25% | Max | |
| Ex. 1 | 19 | 8.9 | 233 | 257 | 266 | 271 | 282 | 286 | 2.22 |
| Ex. 2 | 17 | 8.4 | 229 | 250 | 259 | 269 | 280 | 300 | 2.01 |
| Ex. 3 | 16 | 8.7 | 222 | 246 | 258 | 268 | 279 | 291 | 1.99 |
| Ex. 4 | 19 | 8.09 | 214 | 245 | 260 | 270 | 282 | 285 | 2.03 |
| Ex. 5 | 16 | 10.3 | 268 | 295 | 314 | 330 | 340 | 345 | 1.70 |
| Ex. 6 | 17 | 11.2 | 288 | 323 | 343 | 359 | 374 | 382 | 0.45 |
| Comp Ex. 1 | 17 | 5.8 | 163 | 192 | 205 | 214 | 224 | 240 | 2.08 |
| Comp. Ex. 2 | 17 | 7.0 | 176 | 193 | 198 | 202 | 207 | 230 | 2.23 |
| Comp Ex. 3 | 25 | 6.1 | 170 | 198 | 214 | 227 | 241 | 333 | — |
| Comp Ex. 4 | 25 | 4.5 | 113 | 152 | 175 | 191 | 201 | 275 | — |
| Comp Ex. 5 | 19 | 3.2 | 91 | 122 | 141 | 150 | 156 | 243 | — |

TABLE 1-continued

| | Wire property | | | | | |
|---|---|---|---|---|---|---|
| | 12.5 µm | 16 µm | 17 µm | 19 µm | 25 µm | 50 µm |
| | | | Abrasion resistance (cycle) | | | |
| Ex. 1 | — | — | — | — | — | 1225 |
| Ex. 2 | 1.6 | — | 4.0 | — | 24 | 1110 |
| Ex. 3 | — | 3.8 | — | — | — | 1163 |
| Ex. 4 | 1.8 | — | — | — | 28 | 1153 |
| Ex. 5 | 5 | — | — | — | 41.0 | 6912 |
| Ex. 6 | — | — | — | — | — | 9033 |
| Comp. Ex. 1 | — | — | — | — | — | 373 |
| Comp. Ex. 2 | — | — | — | — | — | 140 |
| Comp. Ex. 3 | 1.2 | — | — | — | 7.4 | 585 |
| Comp. Ex. 4 | 1.1 | — | — | — | 4.8 | 92 |
| Comp. Ex. 5 | 1.0 | — | — | 1.6 | 4.0 | 37 |

With respect to above Examples 2, 4, 5 and Comparative Examples 3, 5, an assessment wire were prepared using polyimide films in three types of thickness (11.5-13.5 µm (average thickness 12.5 µm); 24.0-26.0 µm (average thickness 25.0 µm); 48.0-52.0 µm (average thickness 50.0 µm)) respectively to measure their abrasion resistance (cycle). FIG. 1 depicts the measurement results (single logarithmic chart).

Based on FIG. 1, it is understood that whereas it is sufficient for an insulating coating material related to the present embodiments to have at most a thickness of approximately 22 µm in order to make abrasion resistance 10 cycles or greater, the conventional insulating coating materials require a thickness of 26 µm or greater. That is, by using an insulating coating material related to the present embodiments, it enables to make the material thinner (achieve weight-saving) for the same abrasion resistance as compared to the conventional insulating coating materials. Therefore, the present invention is capable of providing an insulating coating material that is lightweight and has excellent abrasion resistance.

Synthesis Example 9: Synthesis of Polyimide Precursor 9

667.7 g of DMF is input into a 2,000 ml-content glass flask, to which were added 73.8 g (250.8 mmol) of BPDA, 14.3 g (44.4 mmol) of BTDA, 31.0 g (286.7 mmol) of PDA, and mixed for 1 hour. The reaction solution was added gradually by a DMF solution of PDA that was separately arranged (7 wt %) until a viscosity reaches 2,500 poise when the addition was stopped. Polyimide Precursor 9 was so obtained.

TABLE 2 depicts mol % of each of dianhydride components and diamine components used in the entire steps.

Synthesis Example 10: Synthesis of Polyimide Precursor 10

668.3 g of DMF is input into a 2,000 ml-content glass flask, to which were added 82.1 g (279.1 mmol) of BPDA, 12.2 g (41.7 mmol) of 1,3-bis(4-aminophenoxy)benzene (TPE-R), 24.7 g (228.4 mmol) of PDA, and mixed for 1 hour. The reaction solution was added gradually by a DMF solution of PDA that was separately arranged (7 wt %) until a viscosity reaches 2,500 poise when the addition was stopped. Polyimide Precursor 10 was so obtained.

TABLE 2 depicts mol % of each of dianhydride components and diamine components used in the entire steps.

Synthesis Example 11: Synthesis of Polyimide Precursor 11

668.8 g of DMF is input into a 2,000 ml-content glass flask, to which were added 78.9 g (268.2 mmol) of BPDA, 16.5 g (40.2 mmol) of BAPP, 23.8 g (220.1 mmol) of PDA, and mixed for 1 hour. The reaction solution was added gradually by a DMF solution of PDA that was separately arranged (7 wt %) until a viscosity reaches 2,500 poise when the addition was stopped. Polyimide Precursor 11 was so obtained.

TABLE 2 depicts mol % of each of dianhydride components and diamine components used in the entire steps.

Synthesis Example 12: Synthesis of Polyimide Precursor 12

655.1 g of DMF is input into a 2,000 ml-content glass flask, to which were added 22.3 g (206.2 mmol) of PDA, 38.2 g (129.8 mmol) of BPDA, 18.0 g (55.9 mmol) of BTDA, and mixed for 1 hour. Further, 17.7 g (88.4 mmol) of ODA and 22.8 g (104.5 mmol) of PMDA were added, and mixed for 1 hour. The reaction solution was added gradually by a DMF solution of PMDA that was separately arranged (7 wt %) until a viscosity at 23° C. reaches 2,500 poise when the addition was stopped. Polyimide Precursor 12 was so obtained.

Synthesis Example 13: Synthesis of Polyimide Precursor 13

654.9 g of DMF is input into a 2,000 ml-content glass flask, to which were added 22.5 g (208.1 mmol) of PDA, 47.1 g (160.1 mmol) of BPDA, 8.6 g (26.7 mmol) of BTDA, and mixed for 1 hour. Further, 17.8 g (88.9 mmol) of ODA and 22.9 g (105.0 mmol) of PMDA were added, and mixed for 1 hour. The reaction solution was added gradually by a DMF solution of PMDA that was separately arranged (7 wt %) until a viscosity at 23° C. reaches 2,500 poise when the addition was stopped. Polyimide Precursor 13 was so obtained.

Synthesis Example 14: Synthesis of Polyimide Precursor 14

634.3 g of DMF is input into a 2,000 ml-content glass flask, to which were added 28.2 g (140.8 mmol) of ODA, 22.9 g (211.8 mmol) of PDA, 31.1 g (105.7 mmol) of BPDA, 51.5 g (236.1 mmol) of PMDA, and mixed for 1 hour. The reaction solution was added gradually by a DMF solution of PMDA that was separately arranged (7 wt %) until a viscosity reaches 2,500 poise when the addition was stopped. Polyimide Precursor 14 was so obtained.

TABLE 2 depicts mol % of each of dianhydride components and diamine components used in the entire steps.

Synthesis Example 15: Synthesis of Polyimide Precursor 15

635.4 g of DMF is input into a 2,000 ml-content glass flask, to which were added 27.2 g (135.8 mmol) of ODA, 22.0 g (203.4 mmol) of PDA, 49.9 g (169.6 mmol) of BPDA, 34.8 g (159.5 mmol) of PMDA, and mixed for 1 hour. The reaction solution was added gradually by a DMF solution of PMDA that was separately arranged (7 wt %) until a viscosity reaches 2,500 poise when the addition was stopped. Polyimide Precursor 15 was so obtained.

TABLE 2 depicts mol % of each of dianhydride components and diamine components used in the entire steps.

Example 7

By using Polyimide Precursor 9 obtained by Synthesis Example 9 and the same cure agent as Example 5, polyimide films were obtained in thickness of 17 μm. A stress at x % strain was measured by use of those polyimide films obtained. The results are shown in TABLE 2. The elastic modulus was 11.4 GPa.

Example 8

By using Polyimide Precursor 10 obtained by Synthesis Example 10 and the same cure agent as Example 1, polyimide films were obtained in thickness of 17 μm. A stress at x % strain was measured by use of those polyimide films obtained. The results are shown in TABLE 2. The elastic modulus was 9.9 GPa.

Example 9

By using Polyimide Precursor 11 obtained by Synthesis Example 11 and the same cure agent as Example 1, polyimide films were obtained in thickness of 17 μm. A stress at x % strain was measured by use of those polyimide films obtained. The results are shown in TABLE 2. The elastic modulus was 9.4 GPa.

Example 10

By using Polyimide Precursor 12 obtained by Synthesis Example 12 and the same cure agent as Example 1, polyimide films were obtained in thickness of 17 μm. A stress at x % strain was measured by use of those polyimide films obtained. The results are shown in TABLE 2. The elastic modulus was 7.7 GPa.

Example 11

By using Polyimide Precursor 13 obtained by Synthesis Example 13 and the same cure agent as Example 1, polyimide films were obtained in thickness of 17 μm. A stress at x % strain was measured by use of those polyimide films obtained. The results are shown in TABLE 2. The elastic modulus was 7.4 GPa.

Comparative Example 6

By using Polyimide Precursor 15 obtained by Synthesis Example 15 and the same cure agent as Example 1, polyimide films were obtained in thickness of 17 μm. A stress at x % strain was measured by use of those polyimide films obtained. The results are shown in TABLE 2. The elastic modulus was 6.1 GPa.

Comparative Example 7

By using Polyimide Precursor 14 obtained by Synthesis Example 14 and the same cure agent as Example 1, polyimide films were obtained in thickness of 17 μm. A stress at x % strain was measured by use of those polyimide films obtained. The results are shown in TABLE 2. The elastic modulus was 6.1 GPa.

TABLE 2 below also depicts Examples 5, 6 and Comparative Examples 3-5 that assess wire property (abrasion resistance) for reference. As TABLE 2 illustrates, it is understood that polyimide films of Examples 5-11 have both a stress at 5% strain and a stress at 15% strain favorably as compared to any of Comparative Examples or the products commercially available at present, having properties of both "high yield strength" and "high resistance against plastic deformation." Therefore, an insulating coating material using such polyimide films have excellent abrasion resistance.

TABLE 2

| | | Molar ratio (%) | | | | | | | |
| | | Diamine | | | | Dianhydride | | | Polymerization |
| | Polymer | BAPP % | ODA % | PDA % | TPE-R % | PMDA % | BTDA % | BPDA % | pattern |
|---|---|---|---|---|---|---|---|---|---|
| Ex. 6 | Synthesis Ex. 6 | 0 | 0 | 100 | 0 | 0 | 0 | 100 | Random |
| Ex. 5 | Synthesis Ex. 5 | 0 | 15 | 85 | 0 | 0 | 0 | 100 | Random |
| Ex. 7 | Synthesis Ex. 9 | 0 | 0 | 100 | 0 | 0 | 15 | 85 | Random |
| Ex. 8 | Synthesis Ex. 10 | 0 | 0 | 85 | 15 | 0 | 0 | 100 | Random |
| Ex. 9 | Synthesis Ex. 11 | 15 | 0 | 85 | 0 | 0 | 0 | 100 | Random |

TABLE 2-continued

| | | | | | | | | | |
|---|---|---|---|---|---|---|---|---|---|
| Ex. 10 | Synthesis Ex. 12 | 0 | 30 | 70 | 0 | 37 | 19 | 44 | Sequence |
| Ex. 11 | Synthesis Ex. 13 | 0 | 30 | 70 | 0 | 37 | 9 | 54 | Sequence |
| Comp. Ex. 6 | Synthesis Ex. 15 | 0 | 40 | 60 | 0 | 50 | 0 | 50 | Random |
| Comp. Ex. 7 | Synthesis Ex. 14 | 0 | 40 | 60 | 0 | 70 | 0 | 30 | Random |
| Comp. Ex. 3 | Kapton E | — | — | — | — | — | — | — | — |
| Comp. Ex. 4 | Apical NPI | — | — | — | — | — | — | — | — |
| Comp. Ex. 5 | Apical AH | — | — | — | — | — | — | — | — |

| | Mechanical property | | | | | | | |
|---|---|---|---|---|---|---|---|---|
| | Film thickness | Elasticity | Stress (MPa) at Strain (%) | | | | | Tear strength during low-temperature heating |
| | (μm) | (GPa) | 5% | 10% | 15% | 20% | 25% | Max | (N/mm) |
| Ex. 6 | 17 | 11.2 | 288 | 323 | 343 | 359 | 374 | 382 | 0.45 |
| Ex. 5 | 16 | 10.3 | 268 | 295 | 314 | 330 | 340 | 345 | 1.70 |
| Ex. 7 | 17 | 11.4 | 300 | 334 | 355 | — | — | 361 | 0.97 |
| Ex. 8 | 17 | 9.9 | 248 | 262 | 278 | — | — | 278 | 1.11 |
| Ex. 9 | 17 | 9.4 | 238 | 258 | 276 | — | — | 285 | 1.42 |
| Ex. 10 | 17 | 7.7 | 213 | 239 | 254 | 267 | 278 | 284 | — |
| Ex. 11 | 17 | 7.4 | 213 | 242 | 255 | — | — | 256 | — |
| Comp. Ex. 6 | 17 | 6.1 | 175 | 208 | 222 | 235 | 247 | 276 | — |
| Comp. Ex. 7 | 17 | 6.1 | 167 | 204 | 221 | 236 | 249 | 260 | — |
| Comp. Ex. 3 | 25 | 6.1 | 170 | 198 | 214 | 227 | 241 | 333 | — |
| Comp. Ex. 4 | 25 | 4.5 | 113 | 152 | 175 | 191 | 201 | 275 | — |
| Comp. Ex. 5 | 19 | 3.2 | 91 | 122 | 141 | 150 | 156 | 243 | |

| | Wire property | | | | | |
|---|---|---|---|---|---|---|
| | 12.5 μm | 16 μm | 17 μm | 19 μm | 25 μm | 50 μm |
| | Abrasion resistance (cycle) | | | | | |
| Ex. 6 | — | — | — | — | — | 9033 |
| Ex. 5 | 4.8 | — | — | — | 41 | 6912 |
| Ex. 7 | — | — | — | — | — | — |
| Ex. 8 | — | — | — | — | — | — |
| Ex. 9 | — | — | — | — | — | — |
| Ex. 10 | — | — | — | — | — | — |
| Ex. 11 | — | — | — | — | — | — |
| Comp. Ex. 6 | — | — | — | — | — | — |
| Comp. Ex. 7 | — | — | — | — | — | — |
| Comp. Ex. 3 | 1.2 | — | — | — | 7.4 | 585 |
| Comp. Ex. 4 | 1.1 | — | — | — | 4.8 | 92 |
| Comp. Ex. 5 | 1.0 | — | — | 1.6 | 4.0 | 37 |

Synthesis Example 16: Synthesis of Polyimide Precursor 16

656.7 g of DMF is input into a 2,000 ml-content glass flask, to which were added 22.1 g (110.4 mmol) of 4,4'-oxydianiline (ODA), 11.3 g (27.5 mmol) of BAPP, 16.2 g (55.1 mmol) of BPDA, 22.2 g (68.9 mmol) of BTDA, which was mixed for 1 hour. Further, 14.9 g (137.8 mmol) of PDA, 31.3 g (143.5 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 16 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 63.2 mol %.

Synthesis Example 17: Synthesis of Polyimide Precursor 17

655.7 g of DMF is input into a 2,000 ml-content glass flask, to which were added 28.9 g (144.3 mmol) of 4,4'-ODA, 8.5 g (28.9 mmol) of BPDA, 32.5 g (100.9 mmol) of BTDA, which was mixed for 1 hour. Further, 15.6 g (144.3 mmol) of PDA, 32.7 g (149.9 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 17 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.7 mol %.

Synthesis Example 18: Synthesis of Polyimide Precursor 18

645.9 g of DMF is input into a 2,000 ml-content glass flask, to which were added 31.0 g (154.8 mmol) of 4,4'-ODA, 18.2 g (61.9 mmol) of BPDA, 24.9 g (77.3 mmol) of BTDA, which was mixed for 1 hour. Further, 16.7 g (154.4 mmol) of PDA, 35.1 g (160.9 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 18 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.7 mol %.

Synthesis Example 19: Synthesis of Polyimide Precursor 19

636.3 g of DMF is input into a 2,000 ml-content glass flask, to which were added 32.9 g (164.3 mmol) of 4,4'-ODA, 19.4 g (65.9 mmol) of BPDA, 26.5 g (82.2 mmol) of BTDA, which was mixed for 1 hour. Further, 17.8 g (164.6 mmol) of PDA, 37.3 g (171.0 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 19 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.6 mol %.

Synthesis Example 20: Synthesis of Polyimide Precursor 20

636.1 g of DMF is input into a 2,000 ml-content glass flask, to which were added 33.1 g (165.3 mmol) of 4,4'-ODA, 19.4 g (65.9 mmol) of BPDA, 24.5 g (76.0 mmol) of BTDA, which was mixed for 1 hour. Further, 17.9 g (165.5 mmol) of PDA, 38.9 g (178.3 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 20 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 53.8 mol %.

Synthesis Example 21: Synthesis of Polyimide Precursor 21

655.2 g of DMF is input into a 2,000 ml-content glass flask, to which were added 29.4 g (146.8 mmol) of 4,4'-ODA, 17.3 g (58.8 mmol) of BPDA, 18.9 g (58.7 mmol) of BTDA, which was mixed for 1 hour. Further, 15.9 g (147 mmol) of PDA, 36.5 g (167.3 mmol) of PMDA were added, and mixed for 1 hour. The reaction solution was added gradually by a DMF solution of PMDA that was separately arranged (6 wt %) until a viscosity reaches 2,600 poise when the addition was stopped. Polyimide Precursor 21 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 55.6 mol %.

Synthesis Example 22: Synthesis of Polyimide Precursor 22

655.4 g of DMF is input into a 2,000 ml-content glass flask, to which were added 29.2 g (145.8 mmol) of 4,4'-ODA, 21.4 g (72.7 mmol) of BPDA, 18.8 g (58.3 mmol) of BTDA, which was mixed for 1 hour. Further, 15.7 g (145.2 mmol) of PDA, 33.0 g (151.3 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 22 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.7 mol %.

Synthesis Example 23: Synthesis of Polyimide Precursor 23

655.4 g of DMF is input into a 2,000 ml-content glass flask, to which were added 29.3 g (146.3 mmol) of 4,4'-ODA, 25.8 g (87.7 mmol) of BPDA, 14.1 g (43.8 mmol) of BTDA, which was mixed for 1 hour. Further, 15.8 g (146.1 mmol) of PDA, 33.1 g (151.8 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 23 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.7 mol %.

Synthesis Example 24: Synthesis of Polyimide Precursor 24

655.1 g of DMF is input into a 2,000 ml-content glass flask, to which were added 29.6 g (147.8 mmol) of 4,4'-ODA, 39.1 g (132.9 mmol) of BPDA, which was mixed for 1 hour. Further, 16.0 g (148.0 mmol) of PDA, 33.5 g (153.6 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 24 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.7 mol %.

Synthesis Example 25: Synthesis of Polyimide Precursor 25

634.8 g of DMF is input into a 2,000 ml-content glass flask, to which were added 34.6 g (172.8 mmol) of 4,4'-ODA, 22.3 g (69.2 mmol) of BTDA, 16.6 g (76.1 mmol) of PMDA, which was mixed for 1 hour. Further, 18.7 g (172.9 mmol) of PDA, 41.5 g (190.3 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 25 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 54.3 mol %.

Synthesis Example 26: Synthesis of Polyimide Precursor 26

657.0 g of DMF is input into a 2,000 ml-content glass flask, to which were added 21.8 g (108.9 mmol) of 4,4'-ODA, 11.2 g (27.3 mmol) of BAPP, 39.5 g (122.6 mmol) of BTDA, which was mixed for 1 hour. Further, 14.7 g (135.9 mmol) of PDA, 30.9 g (141.7 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 26 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 63.2 mol %.

Synthesis Example 27: Synthesis of Polyimide Precursor 27

636.3 g of DMF is input into a 2,000 ml-content glass flask, to which were added 26.3 g (131.3 mmol) of 4,4'-ODA, 13.5 g (32.9 mmol) of BAPP, 21.2 g (65.8 mmol) of BTDA, 17.9 g (82.1 mmol) of PMDA, which was mixed for 1 hour. Further, 17.8 g (164.6 mmol) of PDA, 37.2 g (170.5 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 27 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 63.2 mol %.

Synthesis Example 28: Synthesis of Polyimide Precursor 28

637.6 g of DMF is input into a 2,000 ml-content glass flask, to which were added 18.8 g (93.9 mmol) of 4,4'-ODA, 25.7 g (62.6 mmol) of BAPP, 20.1 g (62.4 mmol) of BTDA, 17.0 g (77.9 mmol) of PMDA, which was mixed for 1 hour. Further, 16.9 g (156.3 mmol) of PDA, 35.4 g (162.3 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 16 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 73.8 mol %.

Synthesis Example 29: Synthesis of Polyimide Precursor 29

656.6 g of DMF is input into a 2,000 ml-content glass flask, to which were added 27.8 g (138.8 mmol) of 4,4'-ODA, 36.7 g (124.7 mmol) of BPDA, which was mixed for 1 hour. Further, 15.0 g (138.7 mmol) of PDA, 22.3 g (69.2 mmol) of BTDA, 16.3 g (74.7 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 29 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.7 mol %.

Synthesis Example 30: Synthesis of Polyimide Precursor 30

656.2 g of DMF is input into a 2,000 ml-content glass flask, to which were added 28.3 g (141.3 mmol) of 4,4'-ODA, 29.1 g (98.9 mmol) of BPDA, 6.2 g (28.4 mmol) of PMDA, which was mixed for 1 hour. Further, 15.3 g (141.5 mmol) of PDA, 22.7 g (70.4 mmol) of BTDA, 16.6 g (76.1 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 30 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.6 mol %.

Synthesis Example 31: Synthesis of Polyimide Precursor 31

656.7 g of DMF is input into a 2,000 ml-content glass flask, to which were added 27.7 g (138.3 mmol) of 4,4'-ODA, 16.3 g (55.4 mmol) of BPDA, 22.3 g (69.2 mmol) of BTDA, which was mixed for 1 hour. Further, 14.9 g (137.8 mmol) of PDA, 17.8 g (55.2 mmol) of BTDA, 19.3 g (88.5 mmol) of PMDA were added, and mixed for 1 hour. The reaction solution was added gradually by a DMF solution of PMDA that was separately arranged (6 wt %) until a viscosity reaches 2,600 poise when the addition was stopped. Polyimide Precursor 31 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 52.6 mol %.

Synthesis Example 32: Synthesis of Polyimide Precursor 32

638.2 g of DMF is input into a 2,000 ml-content glass flask, to which were added 40.5 g (98.7 mmol) of BAPP, 13.2 g (65.9 mmol) of 4,4'-ODA, 19.3 g (65.6 mmol) of BPDA, 17.9 g (82.1 mmol) of PMDA, which was mixed for 1 hour. Further, 17.8 g (164.6 mmol) of PDA, 38.3 g (175.6 mmol) of PMDA were added, and mixed for 1 hour. The reaction solution was added gradually by a DMF solution of PMDA that was separately arranged (7 wt %) until a viscosity reaches 2,500 poise when the addition was stopped. Polyimide Precursor 32 was so obtained.

TABLE 3 depicts mol % of each of dianhydride components and diamine components used in the entire steps.

When the total molar amount of dianhydride components and diamine components used in the step (A) is set as 100 mol % and ether amount is calculated in the same way as Synthesis Example 1, the ether amount is 84.3 mol %.

Synthesis Example 33: Synthesis of Polyimide Precursor 33

634.8 g of DMF is input into a 2,000 ml-content glass flask, to which were added 34.6 g (172.8 mmol) of 4,4'-ODA, 18.7 g (172.9 mmol) of PDA, 22.3 g (69.2 mmol) of BTDA, 58.1 g (266.4 mmol) of PMDA, which was mixed for 1 hour. The reaction solution was added gradually by a DMF solution of PMDA that was separately arranged (7 wt %) until a viscosity reaches 2,500 poise when the addition was stopped. Polyimide Precursor 33 was so obtained.

TABLE 3 depicts mol % of each of dianhydride components and diamine components used in the entire steps.

Synthesis Example 34: Synthesis of Polyimide Precursor 34

638.9 g of DMF is input into a 2,000 ml-content glass flask, to which were added 36.7 g (89.4 mmol) of BAPP, 11.9 g (59.4 mmol) of 4,4'-ODA, 16.1 g (148.9 mmol) of PDA, 19.2 g (59.6 mmol) of BTDA, 50.1 g (229.7 mmol) of PMDA, which was mixed for 1 hour. The reaction solution was added gradually by a DMF solution of PMDA that was separately arranged (7 wt %) until a viscosity reaches 2,500 poise when the addition was stopped. Polyimide Precursor 34 was so obtained.

TABLE 3 depicts mol % of each of dianhydride components and diamine components used in the entire steps.

Synthesis Example 35: Synthesis of Polyimide Precursor 35

652.0 g of DMF is input into a 2,000 ml-content glass flask, to which were added 40.5 g (98.7 mmol) of BAPP, 13.2 g (65.9 mmol) of 4,4'-ODA, 17.8 g (164.6 mmol) of PDA, 19.3 g (65.6 mmol) of BPDA, 57.3 g (262.7 mmol) of PMDA, which was mixed for 1 hour. The reaction solution was added gradually by a DMF solution of PMDA that was separately arranged (6 wt %) until a viscosity reaches 2,600 poise when the addition was stopped. Polyimide Precursor 35 was so obtained.

TABLE 3 depicts mol % of each of dianhydride components and diamine components used in the entire steps.

Example 12

By using Polyimide Precursor 16 obtained by Synthesis Example 16 and the same cure agent as Example 1, polyimide films were obtained in thickness of 18 μm. A stress at x % strain was measured by use of those polyimide films obtained. The results are shown in TABLE 3. The elastic modulus was 8.45 GPa (it is expressed as 8.5 GPa when decimal points are rounded to one significant figure).

Example 13

By using Polyimide Precursor 17 obtained by Synthesis Example 17 and the same cure agent as Example 1, polyimide films were obtained in thickness of 15 μm. A stress at x % strain was measured by use of those polyimide films obtained. The results are shown in TABLE 3. The elastic modulus was 8.46 GPa (it is expressed as 8.5 GPa when decimal points are rounded to one significant figure).

Example 14

By using Polyimide Precursor 18 obtained by Synthesis Example 18 and the same cure agent as Example 1, polyimide films were obtained in thickness of 19 μm. A stress at x % strain was measured by use of those polyimide films obtained. The results are shown in TABLE 3. The elastic modulus was 8.34 GPa (it is expressed as 8.3 GPa when decimal points are rounded to one significant figure).

Example 15

By using Polyimide Precursor 19 obtained by Synthesis Example 19 and the same cure agent as Example 1, polyimide films were obtained in thickness of 18 μm. A stress at x % strain was measured by use of those polyimide films obtained. The results are shown in TABLE 3. The elastic modulus was 8.42 GPa (it is expressed as 8.4 GPa when decimal points are rounded to one significant figure).

Example 16

By using Polyimide Precursor 20 obtained by Synthesis Example 20 and the same cure agent as Example 1, polyimide films were obtained in thickness of 19 μm. A stress at x % strain was measured by use of those polyimide films obtained. The results are shown in TABLE 3. The elastic modulus was 8.07 GPa (it is expressed as 8.1 GPa when decimal points are rounded to one significant figure).

Example 17

By using Polyimide Precursor 21 obtained by Synthesis Example 21 and the same cure agent as Example 1, polyimide films were obtained in thickness of 16 μm. A stress at x % strain was measured by use of those polyimide films obtained. The results are shown in TABLE 3. The elastic modulus was 7.89 GPa (it is expressed as 7.9 GPa when decimal points are rounded to one significant figure).

Example 18

By using Polyimide Precursor 22 obtained by Synthesis Example 22 and the same cure agent as Example 1, polyimide films were obtained in thickness of 16 μm. A stress at x % strain was measured by use of those polyimide films obtained. The results are shown in TABLE 3. The elastic modulus was 8.2 GPa.

Example 19

By using Polyimide Precursor 23 obtained by Synthesis Example 23 and the same cure agent as Example 1, polyimide films were obtained in thickness of 17 μm. A stress at x % strain was measured by use of those polyimide films obtained. The results are shown in TABLE 3. The elastic modulus was 8.29 GPa (it is expressed as 8.3 GPa when decimal points are rounded to one significant figure).

Example 20

By using Polyimide Precursor 24 obtained by Synthesis Example 24 and the same cure agent as Example 1, polyimide films were obtained in thickness of 17 μm. A stress at x % strain was measured by use of those polyimide films obtained. The results are shown in TABLE 3. The elastic modulus was 9.22 GPa (it is expressed as 9.2 GPa when decimal points are rounded to one significant figure).

Example 21

By using Polyimide Precursor 25 obtained by Synthesis Example 25 and the same cure agent as Example 1, polyimide films were obtained in thickness of 20 μm. A stress at x % strain was measured by use of those polyimide films obtained. The results are shown in TABLE 3. The elastic modulus was 7.53 GPa (it is expressed as 7.5 GPa when decimal points are rounded to one significant figure).

Example 22

By using Polyimide Precursor 26 obtained by Synthesis Example 26 and the same cure agent as Example 1, polyimide films were obtained in thickness of 17 μm. A stress at x % strain was measured by use of those polyimide films obtained. The results are shown in TABLE 3. The elastic modulus was 8.62 GPa (it is expressed as 8.6 GPa when decimal points are rounded to one significant figure).

Example 23

By using Polyimide Precursor 27 obtained by Synthesis Example 27 and the same cure agent as Example 1, polyimide films were obtained in thickness of 20 μm. A stress at x % strain was measured by use of those polyimide films obtained. The results are shown in TABLE 3. The elastic modulus was 7.63 GPa (it is expressed as 7.6 GPa when decimal points are rounded to one significant figure).

Comparative Example 8

By using Polyimide Precursor 28 obtained by Synthesis Example 28 and the same cure agent as Example 1, polyimide films were obtained in thickness of 20 μm. A stress at x % strain was measured by use of those polyimide films obtained. The results are shown in TABLE 3. The elastic modulus was 7.23 GPa (it is expressed as 7.2 GPa when decimal points are rounded to one significant figure).

Example 24

By using Polyimide Precursor 29 obtained by Synthesis Example 29 and the same cure agent as Example 1, polyimide films were obtained in thickness of 19 μm. A stress at x % strain was measured by use of those polyimide films obtained. The results are shown in TABLE 3. The elastic modulus was 7.2 GPa.

Example 25

By using Polyimide Precursor 30 obtained by Synthesis Example 30 and the same cure agent as Example 1, polyimide films were obtained in thickness of 17 μm. A stress at x % strain was measured by use of those polyimide films obtained. The results are shown in TABLE 3. The elastic modulus was 6.92 GPa (it is expressed as 6.9 GPa when decimal points are rounded to one significant figure).

Example 26

By using Polyimide Precursor 31 obtained by Synthesis Example 31 and the same cure agent as Example 1, polyimide films were obtained in thickness of 15 μm. A stress at x % strain was measured by use of those polyimide films obtained. The results are shown in TABLE 3. The elastic modulus was 7.56 GPa (it is expressed as 7.6 GPa when decimal points are rounded to one significant figure).

Comparative Example 9

By using Polyimide Precursor 32 obtained by Synthesis Example 32 and the same cure agent as Example 1, polyimide films were obtained in thickness of 20 μm. A stress at x % strain was measured by use of those polyimide films obtained. The results are shown in TABLE 3. The elastic modulus was 6.74 GPa (it is expressed as 6.7 GPa when decimal points are rounded to one significant figure).

Comparative Example 10

By using Polyimide Precursor 33 obtained by Synthesis Example 33 and the same cure agent as Example 1, polyimide films were obtained in thickness of 17 μm. A stress at x % strain was measured by use of those polyimide films obtained. The results are shown in TABLE 3. The elastic modulus was 5.706 GPa (it is expressed as 5.7 GPa when decimal points are rounded to one significant figure).

Comparative Example 11

By using Polyimide Precursor 34 obtained by Synthesis Example 34 and the same cure agent as Example 1, polyimide films were obtained in thickness of 18 μm. A stress at x % strain was measured by use of those polyimide films obtained. The results are shown in TABLE 3. The elastic modulus was 4.71 GPa (it is expressed as 4.7 GPa when decimal points are rounded to one significant figure).

Comparative Example 12

By using Polyimide Precursor 35 obtained by Synthesis Example 35 and the same cure agent as Example 1, polyimide films were obtained in thickness of 21 μm. A stress at x % strain was measured by use of those polyimide films obtained. The results are shown in TABLE 3. The elastic modulus was 4.766 GPa (it is expressed as 4.8 GPa when decimal points are rounded to one significant figure).

TABLE 3 below also depicts Examples 1-4 and Comparative Examples 1-5 that assess wire property (abrasion resistance) for reference. As TABLE 3 illustrates, polyimide films of Examples 1-4, 12-26 have both a stress at 5% strain and a stress at 15% strain favorably as compared to any of Comparative Examples or the products commercially available at present, which is understood to mean as having properties of both "high yield strength" and "high resistance against plastic deformation." Therefore, an insulating coating material using such polyimide films have excellent abrasion resistance.

TABLE 3

| | Polymer | Molar ratio (%) | | | | | | | Ether amt. (%) | Polymerization pattern |
| | | Diamine | | | | Dianhydride | | | | |
| | | BAPP | ODA | PDA | TPE-R | PMDA | BTDA | BPDA | | |
|---|---|---|---|---|---|---|---|---|---|---|
| Ex. 12 | Syn. Ex. 16 | 10 | 40 | 50 | 0 | 55 | 25 | 20 | 63.2 | Sequence |
| Ex. 13 | Syn. Ex. 17 | 0 | 50 | 50 | 0 | 55 | 35 | 10 | 52.7 | Sequence |
| Ex. 3 | Syn. Ex. 3 | 0 | 50 | 50 | 0 | 55 | 25 | 20 | 52.6 | Sequence |
| Ex. 14 | Syn. Ex. 18 | | | | | | | | 52.7 | Sequence |
| Ex. 15 | Syn. Ex. 19 | | | | | | | | 52.6 | Sequence |
| Ex. 4 | Syn. Ex. 4 | 0 | 50 | 50 | 0 | 57 | 23 | 20 | 53.7 | Sequence |
| Ex. 16 | Syn. Ex. 20 | | | | | | | | 53.8 | Sequence |
| Ex. 17 | Syn. Ex. 21 | 0 | 50 | 50 | 0 | 60 | 20 | 20 | 55.6 | Sequence |
| Ex. 18 | Syn. Ex. 22 | 0 | 50 | 50 | 0 | 55 | 20 | 25 | 52.7 | Sequence |
| Ex. 19 | Syn. Ex. 23 | 0 | 50 | 50 | 0 | 55 | 15 | 30 | 52.7 | Sequence |
| Ex. 20 | Syn. Ex. 24 | 0 | 50 | 50 | 0 | 55 | 0 | 45 | 52.7 | Sequence |
| Ex. 21 | Syn. Ex. 25 | 0 | 50 | 50 | 0 | 80 | 20 | 0 | 54.3 | Sequence |
| Ex. 2 | Syn. Ex. 2 | 0 | 50 | 50 | 0 | 55 | 45 | 0 | 52.7 | Sequence |
| Ex. 22 | Syn. Ex. 26 | 10 | 40 | 50 | 0 | 55 | 45 | 0 | 63.2 | Sequence |
| Ex. 23 | Syn. Ex. 27 | 10 | 40 | 50 | 0 | 80 | 20 | 0 | 63.2 | Sequence |
| Comp Ex. 8 | Syn. Ex. 28 | 20 | 30 | 50 | 0 | 80 | 20 | 0 | 73.8 | Sequence |
| Comp Ex. 2 | Syn. Ex. 8 | 30 | 20 | 50 | 0 | 80 | 20 | 0 | 84.1 | Sequence |
| Ex. 24 | Syn. Ex. 29 | 0 | 50 | 50 | 0 | 30 | 25 | 45 | 52.7 | Sequence |
| Ex. 25 | Syn. Ex. 30 | 0 | 50 | 50 | 0 | 40 | 25 | 35 | 52.6 | Sequence |
| Ex. 26 | Syn. Ex. 31 | 0 | 50 | 50 | 0 | 35 | 45 | 20 | 52.6 | Sequence |
| Ex. 1 | Syn. Ex. 1 | 0 | 45 | 55 | 0 | 50 | 50 | 0 | 47.4 | Sequence |
| Comp Ex. 9 | Syn. Ex. 32 | 30 | 20 | 50 | 0 | 80 | 0 | 20 | 84.3 | Sequence |
| Comp Ex. 10 | Syn. Ex. 33 | 0 | 50 | 50 | 0 | 80 | 20 | 0 | — | Random |
| Comp Ex. 11 | Syn. Ex. 34 | 30 | 20 | 50 | 0 | 80 | 20 | 0 | — | Random |
| Comp Ex. 1 | Syn. Ex. 7 | 0 | 50 | 50 | 0 | 55 | 25 | 20 | — | Random |
| Comp Ex. 12 | Syn. Ex. 35 | 30 | 20 | 50 | 0 | 80 | 0 | 20 | — | Random |
| Comp Ex. 3 | Kapton E | — | — | — | — | — | — | — | — | — |

TABLE 3-continued

| | | | | | | | | | |
|---|---|---|---|---|---|---|---|---|---|
| Comp. Ex. 4 | Apical NPI | — | — | — | — | — | — | — | — |
| Comp. Ex. 5 | Apical AH | — | — | — | — | — | — | — | — |

| | Mechanical property | | | | | | | |
|---|---|---|---|---|---|---|---|---|
| | Film thickness (μm) | Modulus of Elasticity (GPa) | Stress (MPa) at Strain (%) | | | | | Tear strength during low-temperature baking (N/mm) |
| | | | 5% | 10% | 15% | 20% | 25% | Max | |
| Ex. 12 | 18 | 8.45 | 218 | 240 | 249 | — | — | 251 | 2.07 |
| Ex. 13 | 15 | 8.46 | 223 | 252 | 265 | — | — | 269 | 1.91 |
| Ex. 3 | 16 | 8.7 | 222 | 264 | 258 | 268 | 279 | 291 | 1.99 |
| Ex. 14 | 19 | 8.34 | 220 | 247 | 260 | 272 | 284 | 290 | 2.07 |
| Ex. 15 | 18 | 8.42 | 221 | 249 | 262 | 274 | 286 | 287 | 1.23 |
| Ex. 4 | 19 | 8.09 | 214 | 245 | 260 | 270 | 282 | 290 | 1.64 |
| Ex. 16 | 19 | 8.07 | 212 | 242 | 255 | 267 | 277 | 281 | 1.00 |
| Ex. 17 | 16 | 7.89 | 210 | 245 | 261 | 273 | — | 276 | 0.93 |
| Ex. 18 | 16 | 8.2 | 225 | 259 | 274 | — | — | 282 | 2.01 |
| Ex. 19 | 17 | 8.29 | 223 | 255 | 271 | 287 | — | 290 | 0.99 |
| Ex. 20 | 17 | 9.22 | 235 | 269 | 288 | — | — | 295 | 1.02 |
| Ex. 21 | 20 | 7.53 | 186 | 218 | 232 | 242 | 251 | 276 | 0.66 |
| Ex. 2 | 17 | 8.4 | 229 | 250 | 259 | 269 | 280 | 300 | 2.01 |
| Ex. 22 | 17 | 8.62 | 222 | 239 | 254 | — | — | 265 | 1.97 |
| Ex. 23 | 20 | 7.63 | 188 | 214 | 225 | 232 | 244 | 245 | 2.07 |
| Comp. Ex. 8 | 20 | 7.23 | 179 | 203 | 211 | 221 | — | 223 | 2.00 |
| Comp. Ex. 2 | 17 | 7.0 | 176 | 193 | 198 | 202 | 207 | 230 | 2.23 |
| Ex. 24 | 19 | 7.2 | 197 | 232 | 246 | 260 | — | 267 | 1.49 |
| Ex. 25 | 17 | 6.92 | 193 | 233 | 250 | 267 | 282 | 299 | 1.78 |
| Ex. 26 | 15 | 7.56 | 209 | 240 | 253 | 263 | 275 | 281 | 2.00 |
| Ex. 1 | 19 | 8.89 | 233 | 257 | 266 | 271 | 282 | 286 | 2.22 |
| Comp. Ex. 9 | 20 | 6.74 | 165 | 189 | — | — | — | 199 | 1.02 |
| Comp. Ex. 10 | 17 | 5.706 | 147 | 183 | 197 | 206 | 215 | 246 | 0.67 |
| Comp. Ex. 11 | 18 | 4.71 | 123 | 152 | — | — | — | 161 | 0.59 |
| Comp. Ex. 1 | 17 | 5.8 | 163 | 192 | 205 | 214 | 224 | 240 | 2.08 |
| Comp. Ex. 12 | 21 | 4.766 | 122 | 152 | 161 | 164 | — | 168 | 0.41 |
| Comp. Ex. 3 | 25 | 6.1 | 170 | 198 | 214 | 227 | 241 | 333 | — |
| Comp. Ex. 4 | 25 | 4.5 | 113 | 152 | 175 | 191 | 201 | 275 | — |
| Comp. Ex. 5 | 19 | 3.2 | 91 | 122 | 141 | 150 | 156 | 243 | — |

| | Wire propery | | | | | |
|---|---|---|---|---|---|---|
| | 12.5 μm | 16 μm | 17 μm | 19 μm | 25 μm | 50 μm |
| | Abrasion resistance (cycle) | | | | | |
| Ex. 12 | — | — | — | — | — | — |
| Ex. 13 | — | — | — | — | — | — |
| Ex. 3 | — | 3.8 | — | — | — | 1163 |
| Ex. 14 | — | — | — | — | — | — |
| Ex. 15 | — | — | — | — | — | — |
| Ex. 4 | 1.8 | — | — | — | 28 | 1153 |
| Ex. 16 | — | — | — | — | — | — |
| Ex. 17 | — | — | — | — | — | — |
| Ex. 18 | — | — | — | — | — | — |
| Ex. 19 | — | — | — | — | — | — |
| Ex. 20 | — | — | — | — | — | — |
| Ex. 21 | — | — | — | — | — | — |
| Ex. 2 | — | — | 4.0 | — | — | 1110 |
| Ex. 22 | — | — | — | — | — | — |
| Ex. 23 | — | — | — | — | — | — |
| Comp. Ex. 8 | — | — | — | — | — | — |
| Comp. Ex. 2 | — | — | — | — | — | 140 |
| Ex. 24 | — | — | — | — | — | — |
| Ex. 25 | — | — | — | — | — | — |
| Ex. 26 | — | — | — | — | — | — |
| Ex. 1 | — | — | — | — | — | 1225 |
| Comp. Ex. 9 | — | — | — | — | — | — |
| Comp. Ex. 10 | — | — | — | — | — | — |
| Comp. Ex. 11 | — | — | — | — | — | — |
| Comp. Ex. 1 | — | — | — | — | — | — |
| Comp. Ex. 12 | — | — | — | — | — | — |
| Comp. Ex. 3 | 1.2 | — | — | — | 7.4 | 585 |
| Comp. Ex. 4 | 1.1 | — | — | — | 4.8 | 92 |
| Comp. Ex. 5 | 1.0 | — | — | 1.6 | 4.0 | 37 |

INDUSTRIAL APPLICABILITY

According to an insulating coating material related to the present invention, because of its excellent abrasion resistance, it is useful for example to use for an electric wire, cable, etc. in aerospace, and available to utilize in various industrial fields.

The invention claimed is:

1. An insulating coating material consisting of:
an insulating film having a thickness extending between a first surface and an opposing second surface, wherein the insulating film comprises polyimide resin, wherein the insulating film has a thickness ranging from 5 μm to 20 μm; and
an adhesive layer disposed on the first surface of the insulating film,
wherein the adhesive layer comprises a fluororesin,
wherein the second surface of the insulating film is exposed,
wherein the insulating film is a polyimide film obtained by reacting a diamine component and a dianhydride component to form a polyamide acid, and imidizing the polyamide acid to form the polyimide film,
wherein the diamine component and the dianhydride component are reacted using one of the following combinations:
(1) the diamine component comprises p-phenylenediamine (PDA) and oxydianiline (ODA), and the dianhydride component comprises 3,3',4,4'-biphenyltetracarboxylic dianhydride (BPDA) and pyromellitic dianhydride (PMDA),
(2) the diamine component comprises PDA and ODA, and the dianhydride component comprises BPDA, 3,3',4,4'-benzophenonetetracarboxylic dianhydride (BTDA), and PMDA,
(3) the diamine component comprises PDA, and the dianhydride component comprises BPDA and PMDA,
(4) the diamine component comprises PDA and ODA, and the dianhydride component comprises BPDA and BTDA, or
(5) the diamine component comprises PDA, and the dianhydride component comprises BPDA, BTDA, and PMDA,
wherein the insulating film, when a tensile elasticity is measured in accordance with ASTM D882, having a stress at 5% strain is 180 MPa or greater and a stress at 15% strain is 225 MPa or greater, wherein the stress at 15% strain is greater the stress at 5% strain.

2. The insulating coating material in accordance with claim 1, the insulating coating material, when a tensile elasticity is measured in accordance with ASTM D882, having a stress at 10% strain is 210 MPa or greater, wherein the stress at 10% strain is greater than the stress at 5% strain and less than the stress at 15% strain.

3. An insulating cable having an insulated coating film in accordance with claim 1.

4. The insulating cable in accordance with claim 3, wherein the insulating cable comprises an electrical conductor, and the insulating coating material is wrapped around the electric conductor.

5. The insulating coating material in accordance with claim 1, wherein the insulating film has a thickness ranging from 16 μm to 20 μm.

6. An insulating coating material consisting of:
an insulating film having a thickness extending between a first surface and an opposing second surface, wherein the insulating film comprising polyimide resin; and
an adhesive layer consisting of fluororesin, the adhesive layer disposed on the first surface of the insulating film,
wherein the second surface of the insulating film is exposed,
wherein the insulating film is a polyimide film obtained by reacting a diamine component and a dianhydride component to form a polyamide acid, and imidizing the polyamide acid to form the polyimide film,
wherein the diamine component and the dianhydride component are reacted in one of the following combinations:
(1) the diamine component comprises p-phenylenediamine (PDA) and oxydianiline (ODA), and the dianhydride component comprises 3,3',4,4'-biphenyltetracarboxylic dianhydride (BPDA) and pyromellitic dianhydride (PMDA),
(2) the diamine component comprises PDA and ODA, and the dianhydride component comprises BPDA, 3,3',4,4'-benzophenonetetracarboxylic dianhydride (BTDA), and PMDA,
(3) the diamine component comprises PDA, and the dianhydride component comprises BPDA and PMDA,
(4) the diamine component comprises PDA and ODA, and the dianhydride component comprises BPDA and BTDA, or
(5) the diamine component comprises PDA, and the dianhydride component comprises BPDA, BTDA, and PMDA,
wherein a thickness of the insulating film (μm) and abrasion resistance (cycle) satisfy a relationship of the formula (A):

$$\text{Thickness of insulating film} < 6.05*\ln(\text{abrasion resistance}) + 11.0, \quad (A)$$

wherein the abrasion resistance is an average of 5 measurements performed on an assessment wire in accordance with the British Standard Aerospace Series BS EN 3475-503, wherein the assessment wire is a laminated body, the laminated body comprising, in order, layers of an insulating film, tetrafluoroethylene hexafluoropropylene copolymer (FEP) film having a 12 μm thickness, 1 mmφ conductive wire, an FEP film having a 12 μm thickness, and an insulating film, wherein the laminated body is pressurized at 78 kgf/$cm^2$ at 280° C. for 10 minutes, to obtain the assessment wire.

7. The insulating coating material of claim 6, wherein the insulating film has a thickness ranging from 5 μm to 20 μm, and wherein the insulating film, when a tensile elasticity is measured in accordance with ASTM D882, having a stress at 5% strain is 180 MPa or greater and a stress at 15% strain is 225 MPa or greater, wherein the stress at 15% strain is greater the stress at 5% strain.

8. The insulating coating material in accordance with claim 7, wherein the insulating film has a thickness ranging from 16 μm to 20 μm.

9. An insulating coating material consisting of:
an insulating film having a thickness extending between a first surface and an opposing second surface, wherein the insulating film comprises polyimide resin, wherein the insulating film has a thickness ranging from 5 μm to 20 μm; and
an adhesive layer disposed on the first surface of the insulating film, wherein the adhesive layer comprises a fluororesin,
wherein the second surface of the insulting film is exposed,
wherein the insulating film is a polyimide film obtained by reacting a diamine component and a dianhydride component to form a polyamide acid, and imidizing the polyamide acid to form the polyimide film,
wherein the diamine component comprises 65-85 mol % of p-phenylenediamine (PDA), and
the dianhydride component comprises 20-100 mol % of 3,3',4,4'-biphenyl-tetracarboxylic dianhydride (BPDA), and
wherein the insulating film, when a tensile elasticity is measured in accordance with ASTM D882, having a stress at 5% strain is 180 MPa or greater and a stress at 15% strain is 225 MPa or greater, wherein the stress at 15% strain is greater the stress at 5% strain.

10. The insulating coating material in accordance with claim 9, wherein the dianhydride component further comprises 3,3',4,4'-benzophenonetetracarboxylic dianhydride (BTDA).

11. The insulating coating material in accordance with claim 9, wherein the insulating film has a thickness ranging from 16 μm to 20 μm.

12. An insulating coating material comprising:
an insulating film consisting of polyimide resin, wherein the insulating film has a thickness ranging from 5 μm to 20 μm, and wherein the insulating film, when a tensile elasticity is measured in accordance with ASTM D882, having a stress at 5% strain is 180 MPa or greater and a stress at 15% strain is 225 MPa or greater, wherein the stress at 15% strain is greater the stress at 5% strain; and
an adhesive layer consisting of fluororesin, the adhesive layer disposed on a surface of the insulating film,
wherein the insulating film is a polyimide film obtained by reacting a diamine component and a dianhydride component to form a polyamide acid, and imidizing the polyamide acid to form the polyimide film,
wherein the diamine component comprises p-phenylenediamine (PDA) and oxydianiline (ODA),
wherein the dianhydride component comprises 3,3',4,4'-biphenyltetracarboxylic dianhydride (BPDA) 3,3',4,4'-benzophenonetetracarboxylic dianhydride (BTDA), and pyromellitic dianhydride (PMDA), and
wherein the polyimide of the polyimide film is a block copolymer having a first segment obtained from ODA and at least one of BPDA and BTDA, and a second segment obtained from PDA and PMDA.

13. The insulating coating material in accordance with claim 12, wherein the insulating film has a thickness ranging from 16 μm to 20 μm.

* * * * *